United States Patent
Rosen et al.

(10) Patent No.: US 9,573,277 B2
(45) Date of Patent: Feb. 21, 2017

(54) INTELLIGENT VISUAL HUMANOID ROBOT AND COMPUTER VISION SYSTEM PROGRAMMED TO PERFORM VISUAL ARTIFICIAL INTELLIGENCE PROCESSES

(71) Applicants: Alan Rosen, Redondo Beach, CA (US); David B. Rosen, Woodland Hills, CA (US)

(72) Inventors: Alan Rosen, Redondo Beach, CA (US); David B. Rosen, Woodland Hills, CA (US)

( * ) Notice: Subject to any disclaimer, the term of this patent is extended or adjusted under 35 U.S.C. 154(b) by 283 days.

(21) Appl. No.: 14/253,861

(22) Filed: Apr. 15, 2014

(65) Prior Publication Data

US 2017/0008174 A1    Jan. 12, 2017

Related U.S. Application Data

(60) Provisional application No. 61/812,028, filed on Apr. 15, 2013.

(51) Int. Cl.
*G05B 15/00* (2006.01)
*G05B 19/00* (2006.01)
*B25J 9/16* (2006.01)

(52) U.S. Cl.
CPC ................... *B25J 9/1697* (2013.01)

(58) Field of Classification Search
CPC ........................................ B25J 9/1697
USPC ....................................... 700/259
See application file for complete search history.

(56) References Cited

U.S. PATENT DOCUMENTS

| | | | | |
|---|---|---|---|---|
| 4,805,107 A * | 2/1989 | Kieckhafer | ........... | G06F 9/4881 714/15 |
| 5,984,475 A * | 11/1999 | Galiana | ................. | G01S 3/7864 348/E13.014 |
| 6,560,512 B1 * | 5/2003 | Rosen | .................... | B25J 9/1664 700/245 |
| 7,523,080 B1 * | 4/2009 | Yokoe | .................... | G06N 3/004 706/12 |
| 2003/0160877 A1 * | 8/2003 | Sumida | .................. | H04N 9/735 348/223.1 |
| 2014/0176528 A1 * | 6/2014 | Robbins | ............... | G02B 27/225 345/419 |

* cited by examiner

*Primary Examiner* — Harry Oh
(74) *Attorney, Agent, or Firm* — Plager Schack LLP

(57) ABSTRACT

The disclosed visual RRC-humanoid robot is a computer-based system that has been programmed to reach human-like levels of visualization Artificial Intelligence (AI). Behavioral-programming techniques are used to reach human-like levels of identification AI, recognition AI, visualization AI, and comprehension AI. The system is programmed to identify, recognize, visualize and comprehend the full array of sizes, distances, shapes, and colors of objects recorded in the FOV of the system. The following innovative features have been incorporated into the system: (i) incorporation of the RRC, (ii) incorporation of the Relational Correlation Sequencer (RCS): A proprietary RRC-module, (iii) a paradigm shift in the analytical-programming methodology employed in computer vision systems, (iv) incorporation of a central hub of intelligence, (v) design of a "self knowledge" capability and Internalization of all data, and (vi) design of an interface circuit compatible with human-like levels of visualization-AI.

10 Claims, 9 Drawing Sheets

| NUMBER OF FOVS (3-FOVS) | NUMBER OF CONVERGENT DEPTH POSITIONS (6-CONVERGENT DEPTHS) | NUMBER OF SPOTS ON EACH IMAGE PLANE EQUALS THE NUMBER OF CCD-SENSORS IN THE ARRAY |
|---|---|---|
| 0 DEG-AHEAD<br>45 DEG-RIGHT<br>45 DEG-LEFT | DEPTH    ANGLE<br>6CM    45 DEG<br>10CM    30.9 DEG<br>30CM    11.3 DEG<br>60CM    5.7 DEG<br>100 CM    3.4 DEG<br>900 CM    0.4 DEG | 2X100X120=24,000 SPOTS ON EACH IMAGE PLANE |

FIG.8

INTELLIGENT VISUAL HUMANOID ROBOT AND COMPUTER VISION SYSTEM PROGRAMMED TO PERFORM VISUAL ARTIFICIAL INTELLIGENCE PROCESSES

This application claims benefit to U.S. Provisional Patent Application 61/812,028, entitled "An Intelligent Visual RRC-Humanoid Robot: A RRC-Computer vision System Programmed to Reach Human-Like Levels of Visual Artificial Intelligence," filed Apr. 15, 2013. The U.S. Provisional Patent Application 61/812,028 is incorporated herein by reference.

CROSS-REFERENCE TO RELATED APPLICATIONS

This application is related to the following applications: U.S. patent application Ser. No. 10/041,713, entitled "Relational Robotic Controller," filed Jan. 4, 2002, now issued as U.S. Pat. No. 6,560,512; and U.S. patent application Ser. No. 09/761,960, entitled "Relational Correlation Sequencer," filed Jan. 17, 2001. The U.S. patent application Ser. No. 10/041,713, now issued as U.S. Pat. No. 6,560,512, and U.S. patent application Ser. No. 09/761,960 are incorporated herein by reference.

BACKGROUND

Embodiments of the invention described in this specification relate generally to human-like artificial intelligence, and more particularly, to human-like artificial intelligence of relational robotic controller (RRC)-controlled Humanoid robotic systems.

The design of intelligent computers has been a goal of the discipline of Artificial Intelligence (AI) since the advent of digital computers. In 1950, Alan Turing, arguably, the founder of AI, posed the question "when is a machine thinking'?" His approach to an answer was in terms of the behavior of the machine (Turing, A. M. 1950; "Computing machinery and Intelligence" Mind, 59 433-60). He devised an I.Q. 'Turing test' based on the conversational behavior of the machine; and deemed any machine that passed the I.Q.-test to be a thinking machine.

We, in this disclosure, follow Alan Turing and describe a building path for a machine outfitted with human-like visual sensors (eyes) that can reach human-like levels of visual Artificial Intelligence (AI), defined in terms of the behavior of the machine. But instead of programming the computer with visual-AI, we first program a 'robotic self' into the system, that identifies the robotic system, and then program, experientially, all the AI that the robot gains with respect to, or into the robotic self coordinate frame of the system. So that it is the robotic self that develops a high level of visual intelligence, NOT the objective-mechanical digital computer system.

We have thereby designed a system, called a Visual Relational Robotic Controller (RRC)-Humanoid Robot that has a subjective identity and AI-knowledge associated with that identity. It is the 'robotic self,' programmed into the computer that intelligently-visualizes (analogous to human-like 'seeing') not the objective-mechanical digital computer.

We have thereby designed a system, called a Visual Relational Robotic Controller (RRC)-Humanoid Robot that has a subjective identity and AI-knowledge associated with that identity. It is the 'robotic self,' programmed into the computer that intelligently-visualizes (analogous to human-like 'seeing') not the objective-mechanical digital computer.

A Note about Human-Like Levels of AI

Humans develop intelligence (knowledge) from the data obtained from the human external sensors (tactile, visual, auditory, olfactory, gustatory sensors). The emphasis in this disclosure is the visual-AI gained by a visual RRC-controlled system. In general, human-like levels of AI have never before been programmed into computer systems. For that reason the inventors differentiate between objective data and subjective data (data programmed with respect to a 'robotic self' subjective-identity) that may be programmed into a computer system. Objective data represents the data programmed into most of the present day digital computers and computing devices. By use of symbolic logic algorithms these computing devices may exhibit forms of artificial intelligence. However, the authors label all such intelligence as machine-like intelligence, rather than human-like intelligence. Machine-like intelligence may refer to the objective knowledge programmed into all modern day computing devices. Human-like intelligence refers to the data programmed into the computing system with respect to the robotic self-coordinate frame of the system.

All programmable digital computers do not have a "self identity" as a human does, that could absorb and convert all data into subjective knowledge, knowledge absorbed relative to the "self" of the machine. Therefore, the computers do not have human-like intelligence. Computers have machine-like intelligence, not human-like intelligence.

Machine-like intelligence may refer to the objective knowledge programmed into all modern day computing devices. Human-like intelligence is obtained relative to the "self" of the machine. Human-like intelligence is called subjective knowledge.

The following are six requirements of human intelligence that are fundamental to any quantitative measure of intelligence. When those six requirements are imposed on a robotic computer system, the system may achieve human-like levels of AI. Those six requirements also form the basis for a quantitative definition of human-like AI (see lexicography section).

Requirement #1. The Robotic Controller Must Relate, Correlate, Prioritize and Remember Sensory Input Data.

It has been observed that human intelligence in the human brain is generally achieved by relating, correlating, prioritizing and remembering input patterns that are observed by the human sensory system (consisting of the tactile, visual, auditory, olfactory and gustatory sensors). Therefore relating, correlating, prioritizing and remembering must be the essential analytic tool of a robotic controller. The RRC, (a proprietary robotic controller of MCon Inc.), was specifically designed to emulate the operation of the human brain. It also was designed to operate with a 'self' circuit that is the central hub of intelligence for the whole robotic system.

Requirement #2. The Robotic System Must have Proprioceptive Knowledge.

Humans have a self-location and identification coordinate frame that is trained from infancy to give the human brain a proprioceptive self-knowledge capability. Even a baby, with a self-knowledge capability, instinctively knows the location of every surface point on its body, the location of its flailing limbs, and by extension, the location of every coordinate frame point in the near space defined by its flailing limbs. The fundamental design characteristic of any human-like intelligent system is a centralized hub of intelligence that is the centralized "self-location and identification" coordinate frame of the system. The RRC-Humanoid Robot is designed to give the robot a form of proprioceptive knowledge, similar to human proprioceptive intelligence. In the RRC-Robot, the self-knowledge capability is the basis for all knowledge.

Requirement #3. Contextual 'Self-Knowledge' of Other Sensory Data Must be Achieved by Relating/Correlating with the Self-Location and Identification Coordinate Frame of the System.

In order to achieve contextual 'self-knowledge' of the visual data (the subject of this disclosure), auditory data, olfactory data, gustatory data, and vestibular data, all the data obtained from those human-like sensors must be related and correlated with the self-knowledge, self-location and identification coordinate frame. The RRC is ideally suited to relate and correlate the visual, auditory, olfactory, and gustatory data with the self-location and identification coordinate frame that serves as the central hub of intelligence of an RRC-robotic system.

Requirement #4. Human Intelligence is Gained Only from the Human-Like Sensors.

In this disclosure we consider the external sensors: Tactile, visual, auditory, olfactory, gustatory, and vestibular sensors. These sensors provide for the sensations associated with human 'feeling,' 'seeing,' 'hearing,' 'smelling,' 'tasting,' and 'balancing.'

The recording monitors of the RRC-Humanoid Robot are mechano-electric sensors that emulate the external sensors of humans. The 6-robotic sensors should be human-like sensors designed to gain the same information as is gained by the human sensors. These sensors provide for behavioral/experiential intelligence associated with 'experiential feeling,' 'experiential seeing,' (the subject of this disclosure), 'experiential hearing,' 'experiential smelling,' 'experiential tasting,' and 'experiential balancing.' See the disclaimer at the end of the Detailed Description of the Invention Section to clarify that the inventors claim that the robot behaves as if it 'feels,' 'sees,' 'hears,' 'smells,' or 'tastes,' the input data.

Requirement #5. Human Intelligence is Experiential Intelligence.

Humans learn from, and remember their experiences throughout their lifetime. A behaviorally programmed human-like system has a memory system that remembers the experiences of the robot and emulates the experiential intelligence of a human. In this disclosure the robot remembers what it 'sees.' The RRC robot has a memory system that may be behaviorally programmed to remember all its experiences.

Requirement #6. Human-Like Intelligence is Gained Only by a Mechanically Human-Like Robotic System.

The mechanical robotic body and associated sensors must simulate the human body and the human sensors. The robotic body must be bipedal, standing and walking upright with two arms, hands and five fingers per hand free to manipulate objects in the environment. The 6-robotic sensors should be human-like sensors designed to gain the same information as is gained by the human sensors. The mechanical robotic body of the RRC-Humanoid Robot emulates the static and dynamic characteristics of the human body.

Those six requirements must be fulfilled by any robotic computer/controller in order to have a human-like AI capability. Those six requirements form the basis for the robotic definition of human-like intelligence (see lexicography section).

Embodiments of the Invention

RRC-Humanoid Robots

Embodiments of the Invention Described in this Disclosure Pertain to Intelligent Visual RRC-Humanoid Robots.

This disclosure describes an RRC-based computer vision system called a visual RRC-humanoid robot that is programmed to reach human-like levels of visual-AI. This level of visual-AI is analogous to the intelligence that may be gained from the human 'seeing' experience. However, the RRC-controller system has already been patented by the authors and is described in the related applications section. The innovativeness of this disclosure lies in the design of the human-like visual recording monitor, the interface circuit between the recording monitor and the RRC, and the programming of the system so that it can reach human-like levels of visual-AI, analogous to human 'seeing.' The following is a general discussion relating to human-like AI gained by the mechanical analogues to the human external sensors (tactile, visual, auditory, olfactory, gustatory, etc.)

Smart Robotic Systems Programmed to Reach Human-Like High IQ Levels of AI.

A computer based robotic system called an Auditory RRC-humanoid robot is described in this disclosure. The RRC-humanoid robot is a computer-based system that may be programmed to become a highly intelligent "smart system." The intelligence level of the RRC-humanoid robot is exemplified by the low IQ machine devised by Alan Turing, the founding father of Artificial Intelligence (AI)). However, the Turing machine did not have human-like intelligence. It was just another objective computing device programmed to reach machine-like levels of AI. On the other hand, the RRC-humanoid robot is programmed to reach human-like levels of AI by relating all data (knowledge) to a defined/centralized "self" (a self-location and identification coordinate frame) within the computer. The intelligence level (the IQ) of the system is quantified by the number of programmed data-facts that are related and correlated to the self-location and identification coordinate frame of the system. An auditory RRC-humanoid robot (the subject of another disclosure, submitted by the authors), may be programmed to reach IQ-levels exceeding the IQ of a college professor. RRC-recording monitor systems that are programmed to reach human-like levels of AI are called RRC-humanoid robots.

RRC-Humanoid Robots: A Revolutionary Development.

Human-like intelligence levels have never before been programmed into a computer system. The inventors believe that RRC-humanoid robots, exhibiting human-like and super-human-like levels of intelligence will revolutionize the 21st century so that humanoid RRC-robotic systems are as common as automobiles.

An RRC-humanoid robot consists of:

a) A mechanical robotic system: The mechanical system is made up of a human-like robotic body, bipedal limbs, energy-power source, and the motors and gears required to move the body, limbs, arms, hands, and fingers.

b) Sensory recording monitors: The human-like recording monitors are those that simulate the six human external sensors (tactile, vestibular, visual, auditory, olfactory and gustatory). The recording monitors are the data-gathering portions of the RRC-humanoid robotic system. They consist of pressure transducer sensors (tactile), vestibular (balance) sensors, video-visual sensors (the subject of this disclosure)), microphones and verbal phoneme generators (auditory), gas chromatograph (olfactory), and wet mass spectrometer (gustatory). All artificial intelligence for the system is gained by processing/programming the input data obtained from the 5 human-like recording monitors.

c) A Relational Robotic Controller (RRC): The RRC is used to control the motors and verbal phoneme sound generator of the mechanical robotic system. Note that RRC, (U.S. Pat. No. 6,560,512 B1, dated May 6, 2003), is an operating system that has been designed (reverse engineered) to operate like the human brain (based on the assumption that the human brain relates, correlates, prioritizes and remembers rather than computes and solves problems). An RRC consists of sets of Relational Correlation Sequencer (RCS) modules (See the Incorporated Disclosure listed in Related Applications section) and associated memory units called Task Selector Modules (TSMs) that operate by relating and correlating the input signals and prioritizing and remembering important correlations. Relational and correlational training is facilitated by the RCS-modules that make up the RRC-system.

d) An interface circuit between the sensory recording monitors and the RRC-controller: In general, the interface circuit of any intelligent RRC-humanoid robot is the most innovative element in the system. For any one of the recording monitors incorporated into a humanoid RRC-system, four major steps are required to properly design the interface.

1) The required human-like intelligence level of the sensory input q-signals must be specified.

2) The sensory system must be designed so that the discrimination and resolution of the signals is compatible with each of the specifications of each of the 5 human external sensors (tactile, visual, auditory, olfactory and gustatory).

3) The sensory system signals must be calibrated and scaled with the dimensionality and scaling present in the Nodal Map Module (NMM) to which the data is applied.

4) Proof that the interface is properly designed is obtained by specifying the training-programming of the RRC so as to achieve the required level of human-like artificial intelligence.

The inventors have invented 3-preferred embodiments of the patented (tactile) RRC-humanoid robot that may be programmed with human-like intelligence: a) a visual RRC-humanoid robot-equipped with human-like tactile and visual sensors, described in this disclosure and in a provisional application (See related applications), b) an auditory RRC-humanoid robot is built upon the visual humanoid robot by adding human-like auditory sensors and a verbal phoneme sound generator, to give it a verbal "talking" capability (described in a to be submitted, disclosure), and c) a complete RRC-humanoid robot incorporating all 6-human-like external sensors: it is built upon the auditory humanoid robot by adding the human-like olfactory sensor (gas chromatograph) and human-like gustatory sensor (wet mass spectrometer).

The visual RRC-humanoid robot is designed to visualize and internalize the binocular video-visual real time data input to the system. A pre-requisite for visualization is that the system form a 3-dimensional, real time, photometric image of the data that is a high fidelity representation of the Euclidean space objects that gave rise to the image. 'Self-knowledge' or internalization of the data occurs when the photometric image is calibrated and incorporated into the self-location and identification Nodal Map Module associated with the RRC-controller. The robot therefore obtains contextual 'self-knowledge' of the data. At this point, the system may be programmed to identify, recognize, visualize and respond with its body and limbs to the data with a level of human-like AI determined and quantified by the amount of relational and correlational data that is programmed into the system.

The innovativeness of this disclosure lies in the design of an interface that facilitates the internalization and the human-like "self-knowledge" level of intelligence of the visual data. The interface circuit of the visual RRC-recording monitor device is designed to a) generate a high fidelity 3D-photometric image of objects in the environment in which the robot is operating. b) The 3D-photometric image, made up of electronic pixel-signals, must be a high fidelity representation of the objects/colors present in the field of view (FOV) of the visual system. c) The 3D-photometric image is recorded in real time on a visual Nodal Map Module and related, correlated, calibrated and internalized into the 3D-self-location and identification coordinate frame, the "self-knowledge" coordinate frame, of the Nodal Map Module. d) Note that no computations or calculations of image size, distance, shape, form or color are carried out on the 3D-photometric image. All "data-knowledge" is obtained in the visual RRC-system by relating, correlating, prioritizing, storing (remembering), and taking actions that are related to all the characteristics of the 3D-photometric image. Therefore, the 3D-photometric image (made up of electronic pixel-signals) is a high fidelity representation of objects/colors present in the FOV of the visual system. No analysis of image distance, shape form or color need be performed by the visual RRC-humanoid system. Instead, all sizes, shapes forms and colors form a 3D-photometric image that is calibrated with the scaled distances determined in the centralized "self-knowledge" coordinate frame of the system.

THE FIELD OF THE INVENTIVE EMBODIMENTS

The field of the inventive embodiments described in this disclosure is relatively narrow. It is the design and development of various human-like sensory recording monitors that interface with a central controller that meet the requirements #1, #2, #3 and #5 listed on page 5. In the preferred embodiment of this disclosure the patented RRC-controller (U.S. Pat. No. 6,560,512 B1, dated May 6, 2003), is utilized to meet the requirements listed above. However, any relational robotic controller (rrc) (designated by the lower case abbreviation rrc), that meets requirement #1, #2, #3 and #5, may be in the field of the invention. In the following sections the letters RRC denote the patented Relational Robotic Controller utilized in the preferred embodiment of this disclosure. Whereas the lower case letters, rrc (relational robotic controller), denote any robotic controller that meets requirement #1, #2, #3 and #5.

Robotic computing devices that are in the field of this disclosure are constrained by the 6-requirements (listed above) that define human-like levels of AI. After considering the requirements, the inventors conclude that there are five sensory rrc-Humanoid Robotic systems, and one class of super-sensory rrc-Humanoid robotic systems that are in the field of this disclosure.

Only Humanoid RRC-Controlled Robots Equipped with Human-Like Sensors are in the Field of the Inventive Embodiments Only rrc-controlled robots are in the field of the invention. Requirements #1, #2, #3 and #5 assure that only those robots controlled by a rrc (relational robotic controller) may be used to achieve levels of human-like AI.

Two essential elements to programming human-like high IQ-levels of AI into a system limit the field of this disclosure to the group of rrc-controlled Robots. The first is that the rrc must be specifically designed to operate like the human brain (requirement #1). That is, the rrc relates, correlates, prioritizes and remembers (requirement #5) input data, rather than computes, calculates, and display the data, as most modern day computing devices do. The second is the rrc must be specifically designed to adhere to requirements #2, the proprioceptive 'self-knowledge' capability. That is, the rrc must generate a self-location and identification robotic self-coordinate frame that forms a robotic self-identity and a centralized hub of 'intelligence' for the system, and the rrc must be behaviorally programmed (itch-scratch methodology) to emulate the experiential 'self-knowledge' gained by humans (requirement #5). Note that the preferred embodiment, patented RRC meets all those requirements.

Only Humanoid Robots Controlled by Human-Like Sensors are in the Field of Inventive Embodiments Requirements #4 and #6 assure that only robotic systems that are humanoid systems, equipped with human-like sensors are in the field of the inventive embodiments. Requirement #6 assures that the mechanical robotic body is human-like. Requirement #4 assures that the humanoid robot is equipped with the five external human-like sensors (i.e., tactile, visual, auditory, olfactory, and gustatory sensors).

Those requirements restrict the group of rrc-humanoid robots that are in the field of this invention to the following rrc-Humanoid Robots: The tactile, visual, auditory, olfactory, and gustatory rrc-Humanoid robots.

Since all the input data of humans comes from the five external sensors (i.e., tactile, visual, auditory, olfactory, and gustatory sensors), there are five sensory rrc-humanoid robots that may be programmed with human-like AI. In addition, an rrc-Humanoid robot may be equipped with non-human sensors, in addition to its human-like sensors, to form a super-sensory rrc-Humanoid Robot. The super-sensory rrc-humanoid robot is described and listed below as the sixth rrc-Humanoid robot.

1. The tactile rrc-Humanoid Robot: The tactile rrc-humanoid robot must be outfitted with pressure transducer tactile sensors simulating the tactile sensors embedded in the human skin, and vestibular sensors to give the robot a balancing capability. A tactile rrc-humanoid robot must be programmed with a self identity form of AI, an itch-scratch capability to move its body and limbs so as to scratch any itch point on the robotic body, and a bi-pedal ambulating AI-capability with the aid of balance-vestibular sensors. Note that the RRC-humanoid robot meets all those requirements and is in the field of this invention.

2. The visual rrc-Humanoid Robot: The visual rrc-humanoid robot (the subject of this disclosure) is outfitted with a binocular video-visual system that simulates human vision, in addition to the tactile and vestibular sensors of the tactile rrc-humanoid robot. Note that a visual RRC-Humanoid robot programmed with human-like visual-intelligence has been described in a provisional patent submitted by the inventors and listed under related applications. The visual RRC-Humanoid robot may be programmed with a visualization form of AI and its behavioral programming simulates the visualization or 'seeing' intelligence of a human that observe the same three dimensional image as the image formed by the binocular video-visual RRC-Humanoid robotic system.

3. The auditory rrc-Humanoid Robot: The auditory rrc-humanoid robot is a visual RRC-Humanoid robot outfitted with sound pick-up microphones that simulate the human ear, and a verbal phoneme sound generator that gives the robot a verbal vocalizing or 'talking' capability. Note that the auditory RRC-humanoid robot, the subject of a separate disclosure, is a human-like robotic system, controlled by the proprietary Relational Robotic Controller (RRC) and programmed to reach human-like levels of artificial intelligence in 'hearing and understanding' verbal speech with its auditory sensors, and intelligently-verbally responding to the 'heard' verbal speech with its vocalizing verbal-phoneme sound generator.

4. The olfactory rrc-Humanoid Robot: The olfactory rrc-humanoid robot is an auditory rrc-Humanoid robot equipped with a gas chromatograph the simulates the nasal sensory system of humans. This robot must be programmed with a 'smell-sensing' form of AI that simulates the 'smelling' capability of humans. The engineering challenge in the design of the olfactory rrc-humanoid robot is the design of the interface circuit between the gas chromatograph and the rrc so that the robot has a more limited human-like analytic capability of analyzing the air sampled in the gas chromatograph input chamber. A gas chromatograph with a greater than human-like analytic 'smelling' capability is a super-sensor in terms of its analytical capability, and may be used to give the Robot a super-human-like form of AI. However, the more limited human-like form of 'smelling' AI must be designed into the system so that the robot can verbally describe the super smell to humans who have the more limited 'smelling' capability. Note that an olfactory RRC-humanoid robot may be the topic of a future MCon Inc. disclosure.

5. The Gustatory rrc-Humanoid Robot: The gustatory rrc-humanoid robot is an olfactory rrc-Humanoid robot equipped with a wet mass spectrometer the simulates the 'mouth chamber taste' sensory system of humans. This robot must be programmed with a 'tasting' form of AI that simulates the 'tasting' capability of humans. The engineering challenge in the design of the gustatory rrc-humanoid robot is the design of the interface circuit between the wet mass spectrometer and the rrc so that the robot has a more limited, human-like analytic capability of analyzing the food and other objects sampled in the input chamber (for example, wine tasting). A wet mass spectrometer may operate as a super-sensor in terms of its analytical capability, and may be used to give the rrc-humanoid robot a super-human-like form of 'tasting'-AI. However, the more limited human-like form of 'tasting' AI must also be designed into the system so that the robot can verbally describe the super taste as it would be perceived by other humans (without a super-human like tasting capability). Note that a gustatory RRC-humanoid robot may be the topic of a future MCon Inc. disclosure.

6. Super-sensor rrc-Humanoid Robots: Super sensors that give rise to super-human-like AI. An RRC-humanoid robot may gain super human-like intelligence levels by adding non-human sensors to the set of human-like sensors incorporated in the system. Non-human sensors are either sensors operating outside of the human-like sensitivity range, or sensors that are distinctly different from the human-like sensors. Examples of super sensors that operate outside of the human sensitivity range are visual sensors sensitive to Infrared or vacuum-ultra-violet radiation, or sound-microphone sensors sensitive to ultra-sound frequencies (frequencies greater than 20,000 cps). Examples of sensors that are distinctly different from the human-like sensors are antennae's and pre-amplifiers that pickup radio wave, or radar wave electromagnetic frequencies, or X-ray detectors that pick up X-radiation.

In all cases, in order to achieve super-human-like levels of intelligence, the signal data from the non-human sensors must be related and correlated with data from the human like sensors and the self (knowledge) Nodal Map Module. Thereby, the RRC-robot may develop a level of human-like intelligence for the non-human sensors that can be described to other humans in terms of the intelligence achieved by the human-like sensors.

RELATED ART

The field of the invention is relatively narrow. The technologies utilized in the development of parts of rrc-humanoid robots may be related to a large number of commercially available computer based systems. However, the relationship of these technologies to the field of this invention is very tenuous.

Related art that is not in the field of this invention, may include the design and development of all commercial recording monitors (camera recorders, audio recorders, gas chromatographs, wet and dry spectrometers, sonar, radar and various electromagnetic detectors, etc), and possibly all artificially intelligent computer systems and peripherals (personal computers, computers, monitor recorders, printers, telecommunication devices, etc). Recording monitors that do not interface with a RRC controlled robot are not in the field of this invention. Similarly robotic systems that have machine-like artificial intelligence rather than human-like or super human-like artificial intelligence are also not in the field of this invention.

This invention relates to robotic recording monitors that record real time auditory, visual, tactile, vestibular, olfactory, and gustatory data that is utilized by the RRC-Robot, and is specifically NOT utilized by a human observer. The RRC-robot itself performs 3D-real time video camera visualizations, verbal phoneme word-sentence comprehension and generation, pattern recognition and identification, and monitoring of any other real time effect data recorded by the RRC-recording monitor.

Advantages of the RRC-Humanoid Robot

Human-like visualization level of artificial intelligence refers to the capability of the visual RRC-Humanoid robot to be trained/programmed to perform image pattern recognition, identification and comprehension so that the image is a high fidelity representation of objects in the 3-dimensional Euclidean space that gave rise to the image. In order to quantify the amount of programming/analysis required, we have quantitatively defined, in the lexicography section, the amount of programming that must be performed on a RRC-system in order to reach a) the "self-knowledge" level of intelligence, b) the visual "identification" level of intelligence, c) the visual "recognition" level of intelligence, and d) the visual "comprehension" (also called the 'visualization' level of intelligence) level of intelligence. In each case, quantification of the amount of programming/analysis required to reach a high level of visualization-AI is determined by the number and type of relations and correlations programmed into the system.

Quantifying the Amounts of Programming-Analysis Required by the Visual Rrc-System; Comparison with Other Computer Vision Systems Most computer vision systems operate by computing, calculating, and solving problems related to object size, distance, shape, form and color. If such a computer vision system is to be programmed to reach human-like levels of intelligence, the amount of programming code becomes very large because of the boundless number of sizes, shapes, forms, distances, and colors that must be computed to approach human-like levels of visual-discriminatory form of AI.

A visual RRC-system achieves human-like levels of intelligence by relating, correlating prioritizing and remembering the visual input data, rather than computing and solving size, distance, shape, form, or color problems associated with the visual input data. The inventors believe that without a relational visual RRC system, a visual calculating computer can never achieve human-like levels of artificial intelligence, because of the boundless number of sizes, distances, shapes, forms and colors.

The Innovativeness of the Inventive Embodiments

The innovativeness of this disclosure lies in the design of an interface circuit that facilitates the generation of a high fidelity 3D-photometric image of objects in the environment in which the robot is operating. The 3D-photometric image, made up of electronic pixel-signals, must be a high fidelity representation of the objects/colors present in the FOV of the visual system. The 3D-photometric image is recorded in real time on a visual Nodal Map Module and related, correlated, calibrated and internalized into the 3D-self-location and identification coordinate frame, the "self-knowledge" coordinate frame, of the Nodal Map Module. Note that no computations or calculations of image size, distance, shape, form or color are carried out on the 3D-photometric image. All "data-knowledge" is obtained in the visual RRC-system by relating, correlating, prioritizing, storing (remembering), and taking actions that are related to all the characteristics of the 3D-photometric image. Therefore, the 3D-photometric image (made up of electronic pixel-signals) must be a high fidelity representation of objects/colors present in the FOV of the visual system. No analysis of image distance, shape form or color need be performed by the visual RRC-humanoid system. Instead. all sizes, shapes forms and colors form a 3D-photometric image that is calibrated with the scaled distances determined in the centralized "self-knowledge" coordinate frame of the system.

The innovativeness of this disclosure also lies in the RRC-programming that facilitates the internalization of sensory data into the "self-knowledge" module. With the internalization process in place, achieving human-like intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training-programming of the various modules of the RRC. The high levels of training-programming associated with robotic comprehension and visualization imply a large number of relations and correlations between the various sensory signals, programmed into the system.

Advantages, Uniqueness and Improvements Over What Currently Exists

The RRC-Controller for Programming Visualization-AI:

The RRC, (U.S. Pat. No. 6,560,512 B1, dated May 6, 2003), is an operating system that has been designed (reverse engineered) to operate like the human brain (based on the assumption that the human brain relates, correlates, prioritizes and remembers rather than computes and solves problems). An RRC consists of sets of Relational Correlation Sequencer (RCS) modules and associated memory units called Task Selector Modules (TSMs) that operate by relating and correlating the input signals and prioritizing and remembering important correlations.

The Definition of the Robotic 'Self' and Programming 'Self-Knowledge' into the RRC Humanoid Robot.

There is nothing innovative about building a humanoid robot (the mechanical robotic body and limbs that simulate the human body). However the combination of a RRC Humanoid Robot equipped with tactile sensors that define a centralized self-location and identification coordinate frame, and that is programmed to develop 'self-knowledge' for the tactile, visual, and auditory sensors, is innovative in the following manner. a) The tactile pressure transducers cover the total robotic body and form a protective covering that simulates the human skin (with embedded mechano-thermal receptors). This covering gives rise to a coordinate frame and intelligence associated with the motion of limbs in that coordinate frame. b) The visual system simulates, and operates like the human eyes (See provisional application No. 61/812,028 dated Apr. 15, 2013). It forms a 3D-photometric image of the environment that is a high fidelity representation of objects located in the environment. The visual system is programmed to enhance the 'self-knowledge' of the robot by assuring that the robot gains visual 'self-knowledge' of all the input visual data. This is achieved by relating and correlating the visual data to the tactile self-location and identification coordinate frame defined by the tactile data. With visual 'self-knowledge' programmed into the RRC humanoid robot, the visual system is the only environmental sensing system the robot needs to operate intelligently in any environment (It takes the place of radar, lidar, sonar, and/or GPS systems that are often employed by humanoid robotic systems.).

The Design of a Contextual 'Self-Knowledge' Capability for the Visual Sensors:

Contextual 'self-knowledge' of the visual data is designed into the system by relating and correlating all sensory data with the self-knowledge, self-location and identification coordinate frame. The identification and recognition of all colors, shapes, and positioning of the photometric image coupled with contextual 'self-knowledge of the image is what gives the robot the human-like visualization capability. It is important to stress that the expansion of 'self-knowledge' must be applied to all the sensors added to the system (visual, auditory vestibular, olfactory and gustatory). The design of contextual 'self-knowledge' is an innovative technique that gives the robot the capability to gain 'subjective' experiential knowledge about the environment and about the systems that make up the robotic 'self'. It is the technique that allows the robot to operate with human-like levels of AI with all its sensors in any environment in which it gains experiential 'self-knowledge.'

Comparison of RRC-Humanoid Robot with Other Computerized Human-Like AI-Systems

Advantages of an Auditory RRC-System for Defining Human-Like Levels of AI:

The RRC, (U.S. Pat. No. 6,560,512 B1, dated May 6, 2003), is an operating system that has been designed (reverse engineered) to operate like the human brain (based on the assumption that the human brain relates, correlates, prioritizes and remembers rather than computes and solves problems). An RRC consists of sets of Relational Correlation Sequencer (RCS) modules and associated memory units called Task Selector Modules (TSMs) that operate by relating and correlating the input signals and prioritizing and remembering important correlations. Relational and correlational training is facilitated by Relational Correlation Sequencer (RCS)-modules that makes up the RRC-system (see also the Incorporated Disclosure listed in the Related Applications section).

The RRC controls the tasks (including visualization tasks and memory storage and retrieval tasks) performed by a robot. The RRC is programmed to perform all tasks relative to a self-location and identification task, performed by a nodal map, known as the self-nodal map, and associated with one of the RCSs that make up a RRC. A trained self-nodal map gives the robot a level of intelligence that may be called "self-location and identification" knowledge (proprioceptive knowledge). The totality of the "self-location and identification" data, stored in a TSM-memory module, is the basis for the "self-knowledge" capability of the RRC-robot.

In order to be capable of achieving a level of programmed intelligence that can be termed human-like, the RRC-system has a "self-knowledge" capability and it constantly monitors the sensory data throughout the operational lifetime of the robot.

In addition, the sensory data obtained by any robotic system must be "internalized" with respect to the "self-knowledge" memory module. Internalization means that the data from each of the different sensory systems must be related and correlated with the self-knowledge memory module in a manner such that the robot develops "self-knowledge" of the visual data, the auditory data, the olfactory data, and the gustatory data.

The innovativeness of this disclosure also lies in the design of an interface that facilitates the internalization of real time visual data into the "self-knowledge" module. The following innovative features have been incorporated into the design of the interface circuit. a) a methodology for converting the visual input data into a 3-dimensional photometric image that is a high fidelity representation of the objects in the Euclidean space that gave rise to the image. b) the calibration and positioning of the 3-dimensional photometric image onto the self-location and identification, 3-dimensional near space, Nodal Map Module space, around the robot. c) note that step b) is a solution to the ill posed problem of mapping two 2-dimensional images (falling on 2-CCD-arrays separated by the binocular disparity distance0, onto a single 3-dimensional photometric image that is a high fidelity representation of the two 2-dimensional images falling on the 2-CCD-arrays. With the internalization process in place, achieving human-like visualization intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training programming of the various modules of the RRC. The high levels of training-programming associated with robotic comprehension and visualization imply a large number of relations and correlations between the various sensory signals, programmed into the system.

How the Claimed Invention Differs from, and is an Improvement Over What Currently Exists:

The claimed invention is unique and an improvement over what currently exists for the nine reasons outlined below.

1. Incorporation of the RRC: The RRC, (U.S. Pat. No. 6,560,512 B1, dated May 6, 2003), is an operating system that has been designed (reverse engineered) to relate, correlate, prioritize and remember auditory input data. Relating, correlating, prioritizing and remembering visual photometric patterns is the essential analysis tool required to organize and centralize the collected data, and thereby reduce the amount of programming required to access the remembered visual input patterns.

Compared to Other Systems:

Most other computer vision systems calculate, compute and solve problems related to sizes, distances, shapes, and colors of objects recorded in the FOV of the visual system. Such analysis tools generally require an infinite number of programming steps to achieve human-like intelligence levels.

2. Incorporation of the RCS: An RRC consists of sets of Relational Correlation Sequencer (RCS) modules and associated memory units called Task Selector Modules (TSMs) that operate by relating and correlating the input signals and prioritizing and remembering important correlations. The RCS is a proprietary module described in document: Ser. No. 09/761,960, titled "Relational Correlation Sequencer" (RCS), filed Jan. 17, 2001 in the name of David Rosen and Alan Rosen, and incorporated into the RRC-patent (U.S. Pat. No. 6,560,512 B1, dated May 6, 2003.)

Compared to Other Systems:

Most other computer systems are not made up of modules specifically designed to relate and correlate the input signals and prioritize and remember important correlations.

3. Incorporation of a central hub of intelligence: The RRC is programmed to perform all tasks relative to a self-location and identification task, performed by a nodal map, known as the self nodal map/coordinate frame, and associated with one of the RCSs that make up a RRC. It is important to stress the word all, since no task may be performed by the system that is not related to the centralized self-nodal map/coordinate frame. The centralized self-nodal map coordinate frame is the central hub of intelligence for the system. Therefore it is easy to access data stored in the central intelligence hub.

Compared to Other Systems:

Most other computer systems do not relate all the programmed tasks to a single centralized coordinate frame/task. Therefore it is much more difficult to access the diverse "knowledge-data" stored in the computer system.

4. Design of a "self-knowledge" capability: A trained self-nodal map-coordinate frame gives the robot a level of intelligence that may be called "self-location and identification" knowledge. The totality of the programmed "self-location and identification" data, stored in a TSM-memory module, is the basis for the "self-knowledge" level of intelligence. A RRC robot with a fully programmed "self-knowledge" capability "knows" the location of every surface point of the robotic body, the location of flailing limbs, and by extension, the location of every coordinate frame point in the near space defined by flailing limbs.

Compared to Other Systems:

Robotic machines independent of the RRC, which have been designed in the past with the goal of simulating human-like intelligence levels, failed to achieve their goal because the robotic machines did not relate all the data obtained to a "self-knowledge" capability that should have been programmed into the system. Examples of such machines, which do not have a self-knowledge capability, are the famous Turing machine and the chess playing computers that always win when playing against human competitor. Most other computer systems don't have a "self-knowledge" capability-coordinate frame to which all other data may be related. They do not internalize the data into a self-knowledge coordinate frame; that is, they do not relate all the programmed tasks to a single centralized coordinate frame/task.

5. Design of an "awareness"-monitoring capability: In order to be capable of achieving a level of programmed intelligence that can be termed human-like "awareness" of the input data, the robotic system must constantly monitor the sensory data throughout the operational lifetime of the robot, and relate the monitored data to the "self-knowledge" coordinate frame.

Compared to Other Systems:

Most other computer systems designed to perform monitoring or surveillance do not haven a human-like "awareness" capability unless the monitored data is constantly related to a "self-knowledge" coordinate frame. When tactile sensors that form a protective covering of the robotic body, constantly monitor the environment around the robotic body for any possible tactile activation, then robotic "self-knowledge" becomes another level of intelligence called "robotic self awareness" of the tactile environment around the robot. Robotic self awareness coupled with "self-knowledge" of the tactile sensory data may lead to a robotic reaction to the data that is analogous to the human-like modality of "feeling touch-pain" associated with the pressure exerted on tactile mechano-receptors (pressure transducers).

6. Internalization of the data: In a RRC system, the sensory data obtained by any recording monitor must be "internalized" with respect to the "self-knowledge" memory module. Internalization means that the data from each of the sensors must be related and correlated with the self-knowledge memory module in a manner such that the robot develops "self-knowledge" of the visual data, the auditory data, the olfactory data, and the gustatory data. The "self-knowledge" level of intelligence may therefore be gained for the auditory, olfactory, and gustatory sensors, in addition to the visual sensors. And the total "knowledge" gained by the system may be quantified by the number of relations and correlations programmed and stored into the system.

Compared to Other Systems:

The designers of most other computer systems have never quantified the level of intelligence programmed into their system by the number of relations and correlations between the various sensory data inputs. In addition they rarely centralize and store all the relations and correlations into a "self-knowledge" coordinate frame. Therefore, internalization with respect to the "self-knowledge" memory module remains a unique and innovative characteristic of the RRC-recording monitor system.

7. A paradigm shift in the analytical-programming methodology employed in computer vision systems: The analytical-programming methods employed by the visual RRC-humanoid system is a fundamental paradigm shift in the methodology generally employed by other computer vision systems. The shift in emphasis is from analytical programming methodologies involving calculations of image size, distance, shape, form, and color, to an analytical methodology involving relating, correlating, prioritizing and remembering various aspects of the 3D-photometric image.

Compared to Other Systems:

Most other computer-vision systems perform computations and calculations of image size, distance, shape form or color in order to analyze the image. Therefore they fail to achieve human-like levels of AI. In the visual humanoid RRC-system, a human-like level of visualization intelligence is obtained by relating, correlating, prioritizing, remembering and acting on various aspects of the 3D-photometric image. This eliminates the manifold calculations and computations associated with image size, distance, shape form or color. In the RRC-humanoid visual system great emphasis is placed on the formation of a 3D-photometric image that is a high fidelity representation of objects/colors present in the FOV of the visual system. It is that image that is calibrated, applied to the 3D-coordinate frame defined by the "self-knowledge" Nodal Map Module, and related and correlated with other input data. In essence this disclosure reveals a new methodology for solving the problem of mapping two 2-dimensional images into a single 3D-photometric image that is in one to one correspondence with the 3D=objects that gave rise to the image.

8. Design of an interface circuit compatible with human-like levels of AI: The interface circuit of the visual RRC-recording monitor device is designed to generate a high fidelity 3D-photometric image of objects in the environment in which the robot is operating. The 3D-photometric image, made up of electronic pixel-signals, must be a high fidelity representation of the objects/colors present in the FOV of the visual system. The 3D-photometric image is recorded in real time on a visual Nodal Map Module and related, correlated, calibrated and internalized into the 3D-self-location and identification coordinate frame, the "self-knowledge" coordinate frame, of the Nodal Map Module. Note that no computations or calculations of image size, distance, shape, form or color are carried out on the 3D-photometric image. All "data-knowledge" is obtained in the visual RRC-system by relating, correlating, prioritizing, storing (remembering), and taking actions that are related to all the characteristics of the 3D-photometric image. Therefore, the 3D-photometric image (made up of electronic pixel-signals) must be a high fidelity representation of objects/colors present in the FOV of the visual system. No analysis of image distance, shape form or color need be performed by the visual RRC-humanoid system. Instead. all sizes, shapes forms and colors form a 3D-photometric image that is calibrated with the scaled distances determined in the centralized "self-knowledge" coordinate frame of the system.

Compared to Other Systems:

The formation of a high fidelity 3D-photometric image in the interface of the visual RRC-system is a unique, innovative and advantageous way to analyze the image and gather sufficient data to reach the "visualization" level of artificial intelligence. Most other computer-vision systems perform computations and calculations of image size, distance, shape form or color in order to analyze the image, rather than regenerating a high fidelity 3D-photometric image. As stated in advantage #1, such analysis tools may require an infinite number of programming steps to achieve human-like intelligence levels.

9. Quantifying the amount of programming required to reach human-like levels of AI: With the internalization process in place, achieving human-like intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training-programming of the various modules of the RRC. A visual RRC-system achieves human-like levels of intelligence by relating, repeating, correlating, prioritizing and remembering the visual input data, rather than computing shape, form, distance, and color of the visual Image. A visual RRC-system achieves human-like levels of intelligence by relating, correlating, prioritizing and remembering the visual input data, rather than computing and solving size, distance, shape, form, or color problems associated with the visual input data. The inventors believe that without a visual RRC system, a visual calculating computer can never achieve human-like levels of artificial intelligence, because of the infinite amount of code that would be required.

Quantifying the amount of programming required to reach a given level of human-like visual-AI is simply a matter of counting the number of relations and correlations, associated with each characteristic of the photometric image that is to be programmed into the system. For example, to develop a high level of visual-AI while driving a car, The robot needs to relate the distance between the robot's car and the car ahead with the pressure the robot exerts on the accelerator pedal or brake petal. Similarly, the robot also relates the distance between lane markings or curb position with the turning of the steering wheel.

Compared to Other Systems:

The designers of most other intelligent-computer systems have never quantified the level of visual intelligence programmed into their system by the number of relations and correlations between the various sensory data inputs. Most computer vision systems operate by computing, calculating, and solving problems related to object size, distance, shape, form and color. If such a computer vision system were to be programmed to reach human-like levels of visual-AI, the amount of programming code would be orders of magnitude greater than the countable number of relations and correlations described above. In addition other computer systems rarely centralize and store all the relations and correlations into a "self-knowledge" coordinate frame (so as to reach the visualization level of AI). Therefore, our design becomes a quantifiable programming task that can be incorporated into the visual RRC-humanoid system).

Commercialization of the Visual RRC-Humanoid Robot Technology

The commercialization of the Visual RRC-humanoid robot technology is described in the following 2-sections: Section 1) describes the commercial uses of the visual RRC-Robotic system. Section 2) describes the business model for the commercial development of the invention (licensing and joint ventures).

Commercial Use of a Visual RRC-Humanoid Robot.

In the following sections the list of tasks performed by a visual RRC Humanoid robot. Since a visual RRC-humanoid robot may not have verbal communication skills, it is assumed that human communication with RRC-robots is performed by the visual recognition of symbols and visual pattern s, and a minimum amount of verbal communication with humans. Thus, the initiation of an expert task (for example, expert cook, expert waiter (serving food collecting and washing dishes) may require communication with the visual RRC-robot via visual TIT-patterns observed by the visual system, keyboard data added to early versions of the visual RRC-humanoid robot, or by use of a limited number of verbal commands (The visual humanoid robot need not "comprehend" (understand) the meaning of the commands, but need only differentiate, identify, and correlate different expert tasks with different commands).

A visual humanoid robot may be used to perform all tasks that humans perform that do not require verbal communication skills (this includes practically all skilled manual labor and hand manipulation tasks). In a household, a visual humanoid robot may perform all tasks of a household servant (from dish/clothes washer to cook), handyman, guard, or babysitter. In a skilled labor environment a visual humanoid robot may perform the tasks of engine maintenance and repair, jewelry making, watch making and repair, skilled operator of all equipment such as welding, assembly, polish, paint, and all the tasks associated with building and repair (foundation, framing, electrical, plumbing, and appliances). In a office, a visual robot may perform the tasks of a stock-boy, internal mail delivery, guard, or errand boy. In the transportation field, a visual humanoid robot may perform expert driver tasks for cars, trucks, buses, trains, ships and airplanes. For the Department of Defense, a visual humanoid robot may be used for surveillance, monitoring, carrying heavy equipment, or as a expert rifleman, or expert fighter. For NASA, a visual humanoid robot may be used for planetary and lunar exploration, astronautic space mission, and long duration missions to the stars.

The inventors believe that RRC-humanoid robots have the potential of revolutionizing the 21st century. The design, development and manufacture of intelligent humanoid robots may become a major industry, serving individuals, corporations, and local, state, and federal governments. RRC-controllers exhibiting human-like and super-human-like levels of intelligence will revolutionize the 21st century so that humanoid RRC-robotic systems are as common as computers.

Business Model for the Commercial Development of the Invention: Licensing and Joint Ventures.

The invention described herein generally require, for training purposes, a human-like mechanical body and limbs, with input data coming from 6 human-like recording monitors (tactile, vestibular, visual, auditory, olfactory and gustatory sensors), so that the system may be programmed to reach human-like levels of artificial intelligence. The inventors have a strong capability in the commercial design and development of the RRC-controller, the 6 human like recording monitors, the interface design between the RRC and the recording monitors, and the programming of the system so that it may reach human-like levels of artificial intelligence. However, the inventors do not have a strong capability in the commercial development of the state of the art human-like mechanical body and limbs, the power supplies and the structure, motors and gears that make up the mechanical robotic body. Therefore, the inventors plan to license their invention or joint venture with a corporation that can fund the design, development, and manufacture the robotic body, controlled by the RRC-controller. Joint venturing and licensing activities will begin as soon as the invention is patented.

LEXICOGRAPHY

The lexicography section is organized alphabetically with two section breaks denoted by using bold face type on the items to be defined. One section break, collects all the definitions that begin with the word 'human-like.' The other section break, collects all the definitions that begin with the words 'quantitative measure.'

Angular displacement of the Line of Sight (LOS)

The angular displacement of the LOS is defined as the angle between the LOS pointing in the zero direction and the LOS direction displaced along the planar surface from the zero direction. The LOS is defined for a camera system mounted on a planar surface located on a RRC-robotic system. The reference pointing direction of a camera is defined to be the forward direction of motion of the robotic system. The angular displacement of the LOS for a camera pointing in the forward direction of motion is defined to be zero.

Angle opto-sensor. See Convergence Angle Optic Sensor

Auditory RRC-humanoid robot.

A visual humanoid RRC-robot equipped with an auditory RRC recording monitor with a human-like interface and a verbal phoneme sound generator, may be called an auditory humanoid RRC-robot.

Auditory RRC-Humanoid robot.

A visual RRC-humanoid robot equipped with an auditory RRC recording monitor with a human-like interface and a verbal phoneme sound generator, may be called an auditory RRC-humanoid robot.

Behavioral (or experiential) programming.

(Also denoted as experiential programming) Behavioral programming techniques are utilized on all RRC-humanoid systems to achieve high levels of AI for the identification, recognition, visualization or comprehension of the input sensory patterns. Behavior programming is experiential in that the system relates, correlates, prioritizes and remembers input patterns by performing manual dexterity manipulation tasks on the visualized objects and locomotion tasks guided by the visualized objects. For example, the behavioral programming technique employed for the self-location and identification "self-knowledge" coordinate frame is an itch scratch methodology, wherein the robot is fully trained and remembers how to a) reach and touch (scratch) all points located on the surface of the robotic body, and all points in the near space surrounding the robotic body, b) to identify and locate all such points, and c) to identify and locate all the "end joint" body parts (ends of fingers, elbow, knee etc) used to scratch all the itch points. When the level of training reaches the threshold of "self-knowledge," the self nodal map and associated TSMs will facilitate the robotic identification and recognition of all body parts, and the navigation of all moveable parts of the robot towards any and every itch point located on the surface of the robotic body and all points in the near space surrounding the robotic body.

Binocular Disparity [of a visual RRC-two camera recorder]

Refers to the separation of the two CCD-arrays of the 2-video camera system. In order to generate a 3-dimensional photometric image the two CCD-arrays must be separated from one another (by the disparity distance) and must simultaneously record the same image viewed from the disparity perspective.

Cause Vector.

Also denoted as a p-vector, p-field data, or cause vector space: as used herein, a "cause vector" includes those control signals (such as inputs to a motor control) that are used to cause spatial transitions, adjust optical or other sensors, and generate sound in the phoneme sound generator. Generally, cause vectors are related to actions taken by the robot.

Collective modality of a group of sensors.

As used herein the "collective modality" of a group of sensors is the collective-sensation generated when a collective or group of sensor-receptors, made up of individual receptor that have the same modality, are stimulated simultaneously. For example the composite modality of the CCD-arrays is a retinotopic organization of receptors that have tri-chromatic collective modality, a monochromatic low transient response collective modality and a monochromatic high transient response collective modality. For example, the tri-chromatic collective modality gives rise to the sensation of color, whereas the retinotopic organization of the individual tri-chromatic receptors generates a higher resolution image and assures that the color is applied to the correct part of the image.

Comprehension (Robotic).

Robotic "comprehension" is a higher level of "recognition" wherein the robot relates and correlates the signal to other signals. In order to "comprehend" the signal it must be related and co-related to signals activated at a different time or originating from a different source. (For example the robot may be trained to identify an environment wherein it suffers many sharp blows as a bombardment with rocks, or lighter scratches (for example caused by a swarm of bees)). In each case comprehension is achieved if the robot may be trained to accurately recognize the environment and takes appropriate action that proves that it accurately "comprehended" the meaning of all the related and correlated signals. (For example the robot may shield itself either from a bombardment of rocks or a swarm of bees). Higher levels of comprehension are achieved by relating and correlating the signal with a large number of other signals obtained at different times or from different sources. Proof that a higher level of comprehension has been achieved is obtained by training the robot to respond accordingly to all the related and correlated signals (for example the robot may make a decision whether—fight or flight—is the accurate reaction based on the related and correlated data).

Convergence angle.

The convergence angle is the angle between the MLOS and the angular displacement of the LOS of the individual cameras of the 2-camera system. Note that to focus the 2-cameras on the MLOS from close distance to infinity the convergence angle must go from ninety degrees to zero.

Convergence point.

The 2-camera system of the visual RRC recording monitor are constrained to converge and point their LOSs to single points located on the MLOS. The point on the MLOS upon which the 2-LOSs converge on is called the convergence point of the RRC visual system.

Convergence angle optic sensor or angle opto-sensor.

The convergence angle optics sensor also referred to as the angle opto-sensor, is part of the optical apparatus of the visual RRC-recording monitor that measures the convergence angle.

Cyclopean eye.

The Cyclopean eye of the system is designed by projecting the collective modalities of the right and left CCD-camera array onto a single overlay of multiple superposed retinotopic collectives. Each layer of the Cyclopean eye is made up of receiving neurons of a neural network that maintains the retinotopic organization of the CCD-arrays. FIG. 6 shows the distribution of the 3-modality, 6-layered system originating from the CCD-receptors on the right and left camera CCD-array. Each modality forms a binocular superposition of that modality in the Cyclopean eye. For a composite multiple modality CCD-arrays, the Cyclopean eye is made up of multiple collective modalities similar to the 6-collective modality layers shown in FIG. 6. The Cyclopean eye of the visual RRC-recorder refers to the neural network image planes that record all the data obtained from the two 2-dimensional CCD-array image planes. In order to generate a Cyclopean eye which in turn may be used to generate a 3-dimensional photometric image, the two CCD-images separated from one another by the disparity distance must be combined, superposed and "correspondently"-aligned. A Cyclopean eye for a binocular neural net based 3-modality superposed CCD-arrays is presented in FIG. 6 of this disclosure. The two multimodal CCD-arrays (retinotopically organized 3-modality composite arrays) are superposed and "correspondently"-aligned.

Daisy chains.

As used herein, a "daisy chain" is a "line dance" that includes a repetitive-sequential array of a large number of simple sequences of cause vectors.

Declarative Hierarchical Task Diagram (DHTD)

The declarative HTD is the top level specification for a HTD-system that includes a verbal-auditory search engine among the top level search engines located at the top of the hierarchy.

Effect vector.

(Also denoted as q-vectors). Effects vector space or q-field data: as used herein, "effect vectors" are signals received from a set of sensors used to monitor the external and internal environment of the robot. The external environment is received by an array of pressure transducers, pick-up microphones, optical devices and other sensors that are incorporated into the robotic system The internal sensors receive internal data such as the current flow and voltage associated with the motors and sensory systems, the charge in one or more batteries, the lubrication of moving parts and other information that reflect the internal state of the robot. In the preferred embodiment, the effect vectors frame rate is generally determined by the frame rate of the visual video q field data. A specific effect vector often labeled q-final, defines a destination node associated with a particular task initiating trigger.

Frame Rate & Frame Period.

As used herein, the "frame rate" refers to the operational speed of the relational robotic controller (RRC); The frame rate and frame period is fixed in a Procedural Hierarchical Task Diagram (PHTD), and is variable in the DHTD. The "frame period" refers to the time duration of each frame (See the definition of variable frame rate & frame period used in the DHTD). In the Procedural HTD, the control signal output rate of the RRC is limited to a maximum of one p vector control signal leading to a traversal to an adjacent node, per frame period. Whereas, the sequence stepper generates a long sequence of control signals during each frame period that "plans" a navigational path to a destination node, only one motor control p signal is generated by the control signal output during each frame period. (The RRC does "end point planning" at each step of its motion.). See the definition of variable frame rate & frame period used in the DHTD.

Fixation point on the image planes.

The fixation point is the central point measured on the image planes and determined by the convergence points of the 2-camera system. The fixation point is common to the two image planes.

The field of view (FOV).

The field of view (FOV) of a camera system made up of a lens and an array of CCD light detecting sensors is determined by the solid angle originating at the center of the lens and subtended by the areal extent of the CCD-array. The FOV is defined as the same solid angle originating at the center of the lens and extending outward to infinity. The FOVs of two video cameras are shown in FIG. 5.

Hierarchical Task Diagram (HTD).

The hierarchical Task Diagram (HTD) is the top level specification of a RRC-system. The HTD consists of an hierarchical-pyramidal listing of the tasks performed by the RRC-system. Sensory search engines are located at the top of the hierarchy. The search engine searches the input sensory signals for signal patterns that may be identified as TIT. Identification and prioritization of the TITs is performed by TSMs that are associated with each of the tasks listed in the HTD. The programming-training of a RRC-system is a process of training each of the TSMs associated with all the tasks listed on the HTD.

Human-like (general definition).

The term 'human-like' is applied to the robotic body and limbs, to the robotic sensors and to a human-like control system, which has been selected in the preferred embodiment, to be a RRC-controller. Human-like robotic body and limbs consist of a bipedal, two handed, 5-fingers per hand robot controlled by an RRC-controller. Human-like sensors consist of electro-mechanical analogues of the 6 human external sensors (tactile, visual, auditory, olfactory, gustatory, and vestibular (balance) sensors). That input their data to an RRC-controller.

Human-like RRC-recording monitors.

The recording monitors and the input signals generated by them are human-like if a) the recording monitors operate like the human-like receptors that are analogous to one or more of the five human sensory receptors (tactile, visual, auditory, olfactory and gustatory), and b) the sensitivity, intensity, and range of the signals generated by the recording monitor are specified to be the same as the sensitivity intensity and range as the human sensory receptors.

Human-like Artificial Intelligence (AI) (general definition).

A human-like levels of AI may be achieved by any computational system that adheres to the following 6 requirements:

1. The robotic controller must relate, correlate, prioritize and remember the sensory input data.

2. The robotic controller must be programmed to form a "self-identity, in the form of a centralized self-location and identification coordinate frame.

3. Contextual self-location and identification 'knowledge' must be programmed into the system by relating all other sensory data to the 'self-knowledge'-self-location and identification coordinate frame.

4. Human like intelligence is gained only from the human-like sensors.

5. Human-like intelligence is experiential intelligence. The robot must be behaviorally programmed with a memory system that remembers the experiences of the robot throughout its lifetime.

6. Human-like intelligence may be gained only by a mechanically human-like RRC-humanoid robot.

Human-like Artificial Intelligence (AI) Levels of the visual RRC recording monitor.

A human-like level of intelligence is achieved when the signals and/or visual patterns a) are a high fidelity 3-dimensional representation of the objects present in the FOV of the recording monitor, b) are constantly monitored throughout the operational lifetime of the visual system, c) are fully related and correlated and internalized into the self-knowledge Nodal Map Module, and d) are fully trained to move body, limbs, or activate sound generators so that different actions (or the addition of sounds, smells and tastes) differentiate, distinguish, identify and recognize the location and character of 3-dimensional forms and shapes, and the different colors and textures of all the objects in the FOV. When a human-like level of intelligence is achieved by the visual RRC-recording monitor, the robot is said to have a "visualization" capability, a visual awareness capability, a "seeing" capability, and/or a capability to "comprehend" the visual objects present in the FOV of the recording monitor.

Human-like Artificial Intelligence Levels.

Only RRC-robotic systems equipped with 2 of more of the 5 human-like external sensors, and that have a self-location and identification (self-knowledge) module, may achieve human-like intelligence levels. Non-verbal human-like intelligence levels may be gained by a RRC robot equipped with mechanical and visual sensory recording monitors that simulate the human tactile receptors and visual sensors. Higher levels of human-like intelligence may be achieved by adding auditory, olfactory, or gustatory sensors. A robot equipped with tactile and visual sensors may be called a visual humanoid RRC-robot. A visual humanoid RRC-robot equipped with auditory sensors and a verbal phoneme sound generator may be called an auditory humanoid RRC-robot.

Human-like intelligence levels-Visual.

When the visual sensors constantly monitor the environment around the robotic body, it may be possible to achieve human-like intelligence levels for the visual signals by relating the visual signals to "self-knowledge" and control of limbs. Visual monitoring and "self-knowledge" of the visual signals is analogous to a level of intelligence commonly called "seeing" or "visualizing" the visual signals.

Human-like intelligence levels-Auditory.

Human-like AI levels for the auditory recording monitor and associated phoneme sound generator are achieved by relating auditory and verbal sound signals to the visual signals, to the "self-knowledge" signals and to the control of limbs. "Self-knowledge" of the auditory signals and the verbal signals generated by the sound generator is one of the prerequisite steps that lead to a level of intelligence commonly called "hearing with comprehension" and "verbally responding with comprehension" to the auditory signals and the signals generated by the verbal sound generator.

Human-like intelligence levels—Other sensors.

The same can be said for the olfactory sensor (a modified gas chromatograph) leading to intelligent "smelling" and the gustatory sensor (a modified wet spectrometer) leading to intelligent "gustatory tasting."

Human-like interface.

The design of the interface of the RRC-monitor may be human-like when the input sensors of the RRC are human-like. The five human-like mechanical sensors are those analogous to the human tactile, visual, auditory, olfactory, and gustatory sensors. In order to achieve a human-like interface the mechanical human like sensors must be designed with the following sensitivities, operational ranges and intelligence levels:

Tactile sensors must respond to pressure (ranging from light to high), temperature (ranging from warm to cold), high pressure (causing injury to the surface of the robot or pain to the human), and light flutter (senses vibrations or light breeze). In order for the tactile sensors to be human-like they must have the sensitivity and operational range of a human sensor.

Visual sensors operate in the wavelength range between 4000-8000 angstroms. The sensors must form a 3D photometric image which is a high fidelity representation of the objects present in the FOV of the visual sensors. In order for the visual sensors to be human-like the RRC-system must be capable of "visualizing" the trio-chromatic 3D-photometric image and prove that it is capable of identifying, recognizing and comprehending the colored photometric image.

Auditory sensors operate in the audible sound frequency range of up to 20,000 cps. In order for the sensors to be human-like they must be capable of identifying, recognizing and comprehending human verbal speech and music. An auditory RRC monitor may operate with a unique system for performing speech processing (identification and recognition, and comprehension of verbal words and sentences).

Olfactory sensors must respond to the same "smells" that humans respond to. The sensor may be a gas spectrometer that generates a unique spectral decomposition for each "smell" associated with a gas sample. In order for the gas spectrometer sensor to be human-like, it must interface with the RRC-system and prove that it is capable of identifying, recognizing and comprehending the "smells" picked up by the spectrometer.

Gustatory sensors must respond to the same "tastes" that human palate responds to. The sensor may be a wet spectrometer that generates a unique spectral decomposition for each "taste" associated with food, drink, or any other object placed in the input chamber of the spectrometer. In order for the wet spectrometer sensor to be human-like, it must interface with the RRC-system and prove that it is capable of identifying, recognizing and comprehending the "tastes" picked up by the spectrometer.

Humanoid RRC robot. See RRC-Humanoid Robot.

Identification (See "robotic identification").

Robotic "identification" of a signal is a level of intelligence wherein the RRC-system is trained, or programmed to distinguish the source of the signal and the presence or absence of an activated signal (with zero activation defined as no signal whatsoever).

Image plane.

At every convergence point image planes are defined for each of the cameras of the 2-camera system. Each image plane is centered at the convergence point and is normal to the LOS of each camera. The boundaries of each image plane are determined by the areal boundaries of the CCD-arrays (length×width).

Internalization of the data.

"Internalization" of the data is achieved by relating and correlating the data to the "self-knowledge" TSM-memory module, of the "self locating and self identifying robot," relating and correlating each and every input data signal (tactile, visual, or auditory signals) with each other, and relating and correlating each and every input data signal with each and every output-control signal generated by the RRC-controller. It is the internalization of all the input data that allows the RRC-robot to identify, recognized, visualize and comprehend the input signal. Internalization means that the data from each of the sensors must be related and correlated with the self-knowledge memory module in a manner such that the robot develops "self-knowledge" of the visual data, the auditory data, the olfactory data, and the gustatory data. With the internalization process in place, achieving human-like intelligence of the sensory data is dependent on the level of training or programming performed on the RRC-controlled robot. It is a software development involving relations and correlations between signals wherein "robotic self-knowledge," "robotic awareness," "robotic comprehension," "robotic visualization," and "sensation" generation within the RRC, all refer to the level of training-programming of the various modules of the RRC.

Line Dance.

As used herein, a "line dance" is a preprogrammed sequence of cause vectors that are used repeatedly. Line dances are particular useful in the development of tools for performing useful actions associated with those sequences.

Line of sight (LOS).

The LOS is defined for a camera system mounted on a planar surface located on a RRC-robotic system. The pointing direction of the camera, is generally in the forward direction of motion of the robotic system. The LOS of a camera is a straight line emanating from a point located at the center of the CCD-array and passing through the center and perpendicular to the plane of the camera lens, and thence onward to infinity.

Machine-like artificial intelligence levels:

Machine like intelligence is the intelligence level programmed into the present-day state of the art industrial and personal computers and computer controlled robotic systems. All machine-like AI is characterized by the 'objective' data programmed into the machine. That is, data that is not related to the robotic 'self identity' of the machine.

Machine like Interface.

The design of the interface of RRC-monitors are machine-like when the sensors themselves are not human-like or when the sensors are human-like but operative in a sensitivity range that diverges greatly from the human-like sensor sensitivity range. For example radar, lidar, sonar, electromagnetic sensors operating in the microwave, radio or communication frequency bands are not humanlike sensors. Examples of human-like sensors that operate outside of the human sensors sensitivity and range are visual sensors that operate in the x-ray, far ultra violet and infrared portions of the spectrum, or telescopic sensors and microscopic sensors that operate in the 4000-8000 angstrom spectral range.

Memory system within the RRC.

The programmed/trained totality of TSMs associated with and listed in the HTD, represent a memory system within the controller that remembers the procedure for performing the various subtasks listed in the HTD.

Midline line of sight (MLOS).

The MLOS is defined for a two camera system mounted on a planar surface located on a RRC-robotic system. The MLOS is defined as a line originating at the midpoint of the separation between the two camera lenses and proceeding to infinity in a direction parallel to the two zero displacement angle LOSs of the 2-camera system.

Modality of a sensor.

As used herein, the "modality" of a human-like sensor is analogous to the biological modality of a receptor (biological sensor). It is the sensation that is generally associated with the sensor-receptor. For example the modality of a pressure transducer is the "feeling" of touch-pressure. The modality of a single visual-receptor (a single CCD (charge coupled device)) is the sensation of a pinpoint of light. The modality of an auditory microphone tuned to a single frequency is the sensation of a sound generated at the pitch determined by the tuned frequency.

Nodal Map—also abbreviated as NMM (Nodal Map Module).

As used herein, a "nodal map" is a correlation network that maps a relationship between a set of cause vectors (denoted herein as p vectors) and a set of effect vectors (denoted herein as q vectors). The configuration of the nodal map may be in the form of a multi-dimensional Euclidean space, or a multi-dimensional function space of any dimensionality whatsoever, as long as neighboring nodal points in that space are assigned to adjacent positions along the coordinates of the space. Each node in the nodal map is assigned a specific set of multi-dimensional pq vector pairs, which may be expressed in tabular form, with one pq table assigned to each node.

Pavlovian or Conditioning programming techniques.

As used herein, a "Pavlovian programming technique" is a conditioning learning technique that includes a procedure for programming the invention to convert a temporally adjacent q field that is present near, or in conjunction with, a q TIT, into a new TIT operating independently of the q TIT. In this way, the robot "learns" to initiate tasks with new triggers that are associated with the original q TIT.

Procedural Hierarchical Task Diagram (PHTD).

The procedural HTD is the top level specification for a HTD-system that excludes a verbal-auditory search engine from the top level search engines located at the top of the hierarchy Procedural Memory System.

The programmed/trained TSMs listed in the PHTD, gives the robot the capability to "remember how" to perform all the mechanical displacement subtasks listed in the PHTD. The design of the procedural memory capability of the RRC-robot was claimed in RRC-patent U.S. Pat. No. 6,560,512 B1 dated May 6, 2003.

Procedural multi-tasking RRC-robot.

A procedural multi-tasking RRC robot is a robotic system designed and trained by following the top level specifications of a Procedural Hierarchical Task Diagram Quantitative measures of human-like intelligence levels (General def.).

The intelligence of any RRC-robotic system is determined by the number of sensory recording monitors incorporated into the RRC-system and the number of relations and correlations programmed/learned into each, and between the different sensory recording monitors. For any recording monitor included in the field of the invention, in order to achieve human-like levels of artificial intelligence a robotic system must first be equipped with a fully trained "self-knowledge" set of tactile modules that define the coordinate frame in which the robot is operating. Second, the sensory signals arising from other recording monitors (visual, auditory, olfactory, and gustatory sensors that simulate the human external sensory system) must be related and correlated with the "self-knowledge" modules. In addition to inter-monitor training and intra-monitor cross training, there are five defined forms of human-like intelligence that may incorporated into the software developments of the RRC. These software developments quantify the level of training of the recording monitor-data and the amount of data stored in the associated TSM-memory system required to reach the defined form of robotic intelligence. The five forms of robotic intelligence are "robotic self knowledge," "robotic awareness," "robotic identification," "robotic recognition" and "robotic visualization or comprehension" of the input signals. As will be shown in the following definitions, none of these levels of intelligence has ever been programmed into a computer.

Quantitative measure of robotic self-knowledge level of intelligence.

Robotic self-knowledge is programmed into the self-location and identification Nodal Map Module and the Task Selector Module (TSM)-memory system associated with it. Note that the pressure transducers that are uniformly distributed on the robotic body constitute the "robotic skin" of the robot and are used to define the center of gravity of the robot and the coordinate frame in which the robot is operating. Initial self knowledge training is best described in terms of an "itch-scratch" sequence of actions. The robot is trained to move all its limbs or other bodily parts towards any activated pressure transducer (the itch-point) located on the robotic body and limbs and/or a point in the near space surrounding the robotic body and defined by the range of motion of flailing limbs. Robotic self knowledge is achieved when the TSM-memory system of the robot is fully trained and remembers how to a) reach and touch (scratch) all points located on the surface of the robotic body, and all points in the near space surrounding the robotic body, b) to identify and locate all such points, and c) to identify and locate all the "end joint" body parts (ends of fingers, elbow, knee etc) used to scratch all the itch points. When the level of training reaches the threshold of "self-knowledge," the self nodal map and associated TSMs will facilitate the robotic identification and recognition of all body parts, and the navigation of all moveable parts of the robot towards any and every "itch" point located on the surface of the robotic body and all points in the near space surrounding the robotic body. An RRC-robot that has been trained to this most basic level of self-location and identification is said to have a self-knowledge intelligence level or is said to have self-knowledge.

Quantitative measure of robotic "self awareness" level of intelligence.

When tactile sensors that form a protective covering of the robotic body, constantly monitor the environment around the robot body for any possible tactile activation, then robotic "self-knowledge" becomes a higher level of intelligence that is called "robotic self awareness" of the tactile environment around the robot. Robotic self awareness coupled with "self-knowledge" of the tactile sensory data may lead to a robotic reaction to the data that is analogous to the human-like reaction to the "feeling" of "touch-pain" associated with the pressure exerted on tactile mechano-receptors (pressure transducers). A robotic system is said to be "aware" of a sensory activation if the system constantly—that is throughout its operational lifetime—monitors the environment for that sensory activation and relates that activation to the self-location and identification Nodal Map Module and the Task Selector Module (TSM)-memory system associated with it. A RRC robot trained to the basic level of self-knowledge is said to have robotic awareness of tactile activations when the system constantly monitors the environment for any possible tactile activation. In order to 'be-aware' of tactile activations the robot must be trained to distinguish the characteristics of any activation and to respond accordingly. The methodology for distinguishing different tactile activations is by training/programming a different motor response for each different sensory activation. Note that since the visual, auditory, olfactory and gustatory signals must be internalized—that is completely related and correlated with the "self-aware" and "self-knowledge" Nodal Map Modules—then the system may achieve visual self-awareness (visual-awareness is generally called "seeing"), auditory self-awareness (auditory-awareness is generally called "hearing"), olfactory self-awareness (olfactory-awareness is generally called "smelling"), and gustatory self-awareness (gustatory-awareness is generally called "tasting"), of the visual, auditory, olfactory and gustatory signals.

Quantitative measure of robotic "identification" level of intelligence:

Robotic identification is a low level of intelligence associated with training or programming the RRC-robot to distinguish the recording-monitor-source of the signal (tactile, visual, auditory, olfactory and gustatory) and the presence or absence of an activated signal (with zero activation defined as no signal whatsoever). In all cases the recording-monitor-source of the signal, and the signal itself, if it is present, must be related to and correlated with the Self-knowledge Nodal Map Module.

Quantitative measure of robotic "recognition" level of intelligence.

Robotic recognition is a mid-level of intelligence wherein the recording monitor signal of the RRC is trained/programmed with a capability to distinguish and differentiate the location, intensity or magnitude of the pattern/signal, assign a priority level to the signal and relate that location, intensity, or magnitude to the self-knowledge Nodal Map Module. Having recognized and prioritized the signal, the robot may be trained to take action dependent on the recognized/prioritized signal. (For example, recognizing the "itch" point and taking action to "scratch" that point, or recognizing a high priority or low priority obstacle which may or may not cause the robot to take action to avoid the obstacle).

Quantitative measure of robotic "comprehension" level of intelligence.

Robotic comprehension is a high level of intelligence. It includes robotic recognition and additional training of the robot to relate and correlate the signal of the recording monitor to the signals of other recording monitors and simultaneously to the self-knowledge Nodal Map Module. In order for the robotic system to "comprehend" the signal it must be related and co-related with signals activated at a different time or originating from a different source, in addition to being related and correlated to the self-knowledge Nodal Map Module. For example, the visual image of an apple may be related to the verbal word "apple" and may be correlated with the dictionary definition of an apple.

Quantitative measure of higher levels of comprehension intelligence.

Higher levels of intelligence are reached by the robotic system as more signal data from more sensory monitor sources are related and correlated with each other and with the self-knowledge Nodal Map Module. By relating visual data, auditory data, verbal/written words, the verbal words generated by a phoneme sound generator, data from a 50,000 word lexicon and encyclopedic data, to the self-knowledge Nodal Map Module, very high-levels of human-like intelligence and expertise can be programmed into a RRC robotic system.

Recognition (See "Robotic recognition")

Relational Correlation Sequencer also abbreviated as RCS.

As used herein, a "relational correlation sequencer (RCS)" include a nodal map and a sequence stepper that work together to select the motor control cause signals that result in navigating a robot through a nodal space to a desired location. More than one relational correlation sequencer can be hierarchically arranged or stacked, so as to achieve an increasingly complex result.

Retinotopic organization.

Refers to the locational organization of a composite modality CCD-array of the visual receptors (individual CCDs) and their corresponding pixel output signals. The organization of pixels falling on a neural network is said to be retinotopic if the location of each pixel corresponds to the location of the individual CCD from which the pixel originated. For example, the tri-chromatic collective modality gives rise to the sensation of color, whereas the retinotopic organization of the individual tri-chromatic receptors assures that the color is applied to the correct part of the image.

Robotic comprehension (See "comprehension-robotic")

Robotic identification.

Robotic identification is a low level of intelligence associated with training or programming the RRC-robot to distinguish the recording-monitor-source of the signal (tactile, visual, auditory, olfactory and gustatory) and the presence or absence of an activated signal (with zero activation defined as no signal whatsoever). In all cases the recording-monitor-source of the signal, and the signal itself, if it is present, must be related to and correlated with the self-knowledge Nodal Map Module.

Robotic recognition.

Robotic recognition is a mid-level of intelligence wherein the recording monitor signal of the RRC is trained-programmed with a capability to distinguish and differentiate the location, intensity or magnitude of the pattern/signal, assign a priority level to the signal and relate that location, intensity, or magnitude to the self-knowledge Nodal Map Module. Having recognized and prioritized the signal, the robot may be trained to take action dependent on the recognized/prioritized signal.

Robotic visualization or "seeing knowledge".

Visualization is a form of knowledge; a level of intelligence programmed into the system. Visualization is commonly called "seeing knowledge." Visualization or "seeing" knowledge is obtained by internalizing all the different colors, shapes forms and textures into the self-knowledge Nodal Map Module and learning to move the robotic body, limbs or sound generators so as to distinguish manipulate and respond to the different colors, shapes, forms and textures of all the objects in the FOV. The RRC is trained to perform 3D-real time video camera visualizations by performing manual dexterity manipulation tasks on the visualized ("seen") objects and locomotion tasks guided by the visualized objects. Based on the visualized data and the relationship of that data to the self-location and identification coordinate frame, a RRC robot may be taught to perform all locomotive and limb manipulation tasks that range from driving autos to threading a needle.

Robotic self-knowledge level of intelligence. See "self-knowledge" level of intelligence.

Robotic visual sensation or "seeing knowledge" of the photometric image.

Sensations are forms of knowledge; levels of intelligence programmed into the system. The robotic visual sensation of the photometric image refers to the level of intelligence gained by the system with regard to the photometric image. The robotic system is said to have the "sensation" of the photometric image when the level of intelligence of the photometric image reaches the "seeing knowledge" or the robotic visualization level of intelligence. The sensation itself is a form of seeing knowledge of the 3D photometric image inside the controller that consists of CCD—electronic pixels distributed in the 3D-Nodal Map space within the controller. The pixels making up the 3D-photometric image are a high fidelity representation of the 3D-objects located in the FOV of the cameras. In this sense, the photometric image, a mirror image of objects in the FOV, is a "virtual illusion" located within the controller, and the "sensation" represents knowledge of the photometric "virtual illusion." The 3D-virtual image is calibrated with, and related to real objects in the FOVs surrounding the robot, so that no other measurements need be obtained in order to manipulate real-objects or avoid real-obstacles while driving or walking through the 3D-photometric-illusion space.

Robotic comprehension.

Robotic "comprehension" is a higher level of "recognition" wherein the robot relates and correlates the signal to other signals. In order to "comprehend" the signal it must be related and co-related to signals activated at a different time or originating from a different source. (For example the robot may be trained to identify an environment wherein it suffers many sharp blows as a bombardment with rocks, or lighter scratches (for example caused by a swarm of bees)). In each case comprehension is achieved if the robot may be trained to accurately recognize the environment and takes appropriate action that proves that it accurately "comprehended" the meaning of all the related and correlated signals. (For example the robot may shield itself in a different manner from a bombardment of rocks than from a swarm of bees). Higher levels of comprehension are achieved by relating and correlating the signal with a large number of other signals obtained at different times or from different sources. Proof that a higher level of comprehension has been achieved is obtained by training the robot to respond accordingly to all the related and correlated signals (for example the robot may make a decision whether—fight or flight—is the accurate reaction based on the related and correlated data).

Robotic Awareness of Tactile activation.

A robotic system is said to be "aware" of a sensory activation if the system constantly—that is throughout its operational lifetime—monitors the environment for that sensory activation and relates that activation to the self-location and identification Nodal Map Module and the Task Selector Module (TSM)-memory system associated with it. A RRC robot trained to the basic level of self-knowledge is said to have robotic awareness of tactile activations when the system constantly monitors the environment for any possible tactile activation. In order to be "aware" of the tactile activation the robot must be trained to distinguish the characteristics of any activation and to respond accordingly. A self-knowledge intelligence level robot that has been trained throughout its operational lifetime to distinguish and respond to any tactile activation is said to have robotic awareness of that activation.

Robotic self awareness of visual, auditory, olfactory and gustatory activations.

A robotic system is said to be "aware" of a sensory activation if the system constantly—that is throughout its operational lifetime—monitors the environment for that sensory activation and relates that activation to the self-location and identification Nodal Map Module and the Task Selector Module (TSM)-memory system associated with it. Thus if the visual, auditory, olfactory and gustatory signals are internalized—that is completely related and correlated with the "self-aware" and "self-knowledge" Nodal Map Module-then the system may achieve visual self awareness (visual awareness is generally called "seeing"), auditory self awareness (auditory awareness is generally called "hearing"), olfactory self awareness (olfactory awareness is generally called "smelling"), and gustatory self awareness (gustatory awareness is generally called "tasting"), of the visual, auditory, olfactory and gustatory signals.

RRC-Humanoid Robot.

A RRC-humanoid robot, also called a Humanoid-RRC Robot, is generally equipped with human-like body and limbs and all, or part of the human-like sensors. Such a robot has the capability to be behaviorally-programmed to experientially "feel," and/or "see," and/or "hear," and/or "smell," and/or "taste," just like a human, and have the capability to control the robotic body and limbs and the verbal phoneme sound generator so as to verbalize what it "feels," "sees," "smells," "hears," or "tastes.".

rrc-Humanoid Robot.

As used herein, the lower case rrc (relational robotic controller) is used to denote a controller that is not the patented RRC, but meets those requirements imposed on the RRC that allow it to be programmed with human-like levels of AI (Requirements #1, #2, #3 and #5; See human-like levels of AI)

RRC-recording Monitor.

RRC-recording monitors consist of a sensory system and an interface circuit between the sensory system and the RRC-controller. In this disclosure we distinguish between sensory systems and interface circuits that are described by a human-like interface and those described by a machine-like interface.

Self-knowledge intelligence level, Also, Robotic self-knowledge intelligence level.

Robotic self-knowledge is achieved when the TSM-memory system of the robot is fully trained and remembers how to a) reach and touch (scratch) all points located on the surface of the robotic body, and all points in the near space surrounding the robotic body, b) to identify and locate all such points, and c) to identify and locate all the "end joint" body parts (ends of fingers, elbow, knee etc) used to scratch all the itch points. When the level of training reaches the threshold of "self-knowledge," the self nodal map and associated TSMs will facilitate the robotic identification and recognition of all body parts, and the navigation of all moveable parts of the robot towards any and every itch point located on the surface of the robotic body and all points in the near space surrounding the robotic body. An RRC-robot that has been trained to this most basic level of self-location and identification is said to have a self-knowledge intelligence level or is said to have self-knowledge.

Self-location and identification Nodal Map Module.

As used herein, a "self-location and identification nodal map" refers to a pq-nodal map within a Relational Correlation Sequencer wherein the cause vector (p-vector) is trained to navigate one movable part of the robot towards any and all other parts by use of the tactile sensor effect vectors (q-field). This is also referred to as "the self nodal map." The self-location and identification Nodal Map Module (NMM), the so called itch-scratch NMM, is the central NMM to which all other NMMs are related. Relations and correlations between signals are programmed for signals emanating from each recording monitor, and between signals emanating from different recording monitors. When the signal data from other recording monitors are related and correlated with the fully trained central "self-knowledge" coordinate frame, then the system may achieve visual self-knowledge, auditory self knowledge, olfactory self knowledge and gustatory self-knowledge levels of intelligence.

Sequence Stepper also abbreviated as SSM (Sequence Stepper Module).

As used herein, a "sequence stepper" is an element of the relational correlation sequencer. The sequence stepper determines a sequence of steps for navigating through a set of adjacent nodal points in a pq-nodal map that define a sequence of pq vectors from an initial effects vector to a destination effects vector.

Super-intelligent humanoid RRC robots.

An additional level of machine-like intelligence may be gained by any type of humanoid RRC-robot by adding non-human sensors to the set of human-like sensors. In this case, the signal data from the non-human sensors may be related and correlated with data from the human-like sensors and the self (knowledge) Nodal Map Module, and thereby develop a higher level of human-like intelligence for the non-human sensors. Examples of non-human sensors include radar detectors, sonar detectors, GPS detectors, gas chromatograph detectors, mass spectrometer detectors, electromagnetic detectors operating outside of the human 4000-8000 Angstrom range (for example infrared detectors or X-ray detectors), or any other human-like sensor operating outside of the human range of sensitivity. The addition of a non-human RRC-recording monitor that gives a humanoid RRC-robot an additional level of machine-like intelligence or expertise may give rise to a super-intelligent humanoid RRC-robot.

Superposition and correspondence.

Refers to superposition and alignment of the two images produced by the visual RRC-recorder. In order to generate a 3-D photometric image the two CCD-images separated from one another by the disparity distance must be combined, superposed and "correspondently"-aligned so that the central portions of the FOVs correspond to one another, the right peripheral portion of the FOV is unique to the left camera-receiver (CCD-array) and the left peripheral portion of the FOV is unique to the right camera-receiver (CCD-array).

Task Selector—also abbreviated as TSM (Task Selector Module)

As used herein, the "task selector" is trained to select a particular effect vector from all q effect vectors that are applied to the robot at the frame rate. The particular set of effects vectors, selected by the task selector are used as task initiating triggers (TITs). Each TIT is based upon internal or external q field inputs. The TSMs are the primary components of the search engines shown at the top of the HTD. The TSM performs 3-functions: a) It searches the input effect vectors for TIT-patterns. b) It identifies and prioritizes the TIT-pattern. And c) It transmits the highest priority TIT to the Nodal Map Module, Task Initiating Trigger—also abbreviated as TIT As used herein, a "task initiating trigger" (TIT) includes the particular set of effects vectors that are identified by the TSMs. Generally, a TIT consists of two nodes, a q final node and a q initial node. Those two nodes are used by the sequence stepper to determine a sequence of p type control signals that move the robot from its initial nodal location (q initial) to the final nodal location (q final). Verbal auditory TITs consist of a sequence of phoneme sounds that are identified by the auditory TSMs as verbal utterances. The trained auditory TSM solves the speech processing coarticulation problem (also known as the segmentation problem) of mapping the acoustic properties of speech into the phonetic structure of an utterance.

Task Interrupt triggers.

Task Interrupt Triggers are TITs with sufficiently high priority to interrupt the task that the RRC-system is presently performing.

Visual cues.

Visual cues refers to the additional visual data that must be abstracted from the binocular RRC-image in order to convert two 2-dimensional images into a 3-dimensional photometric image that is a high fidelity representation of the objects imaged on the two 2-dimensional CCD-surfaces. The additional visual data, or the visual cues used in this disclosure to determine the third dimension, the depth location, of image pixels offset from the central convergence point on the image plane are as follows:

a) The measured binocular dispersion of objects defined by groups of pixels and their indexed location on the 2-corresponding image planes (Stereopsis).

b) Measure of the relative size of an object. Note that an object that is further appears smaller than the same object placed in a nearer location.

c) The measured color-shape of objects perceived by one camera should correspond to the color-shape of the other camera. The 2-corresponding objects have to represent a single position at a fixed distance.

d) Determine that an object that obscures a portion of another object is nearer than the obscured object.

e) (Note that additional cues are used in this disclosure to identify patterns, patches or splotches of activation) Measured or detected objects, if not identified earlier, may be identified as "matter," which is assumed to be cohesive and smooth. That is, neighboring patches of the world tend to lie on the same smooth surface. Or a LOS must end up on a surface in the world that is not drastically closer or further than the surface hit by a neighboring LOS, f) For un-identified splotches, measure whether the LOS from both cameras end at a splotch on one, and only one, surface in the world (LOS of one camera should not end at two or more surfaces).

Visual RRC-Humanoid robot.

A RRC-robot equipped with tactile and visual recording monitors and a human-like interface may be called a visual humanoid RRC-robot.

Visualization (robotic). See robotic visualization.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

BRIEF DESCRIPTION

Some embodiments of the invention include a visual humanoid RRC-robotic system that is programmed/trained to reach human-like levels of artificial intelligence. Each inventive embodiment includes a video-visual recording monitor, a RRC-controller controlling a mechanical human-like robotic body, the interface circuit between the recording monitor and the RRC, and a description of the training programming required to reach human-like levels of visual artificial intelligence. The innovativeness of the invention resides in the interface circuit between the state of the art video-visual recording monitor and the patented RRC controlled robot, and the programming/training of the system to reach a level of human-like AI. The defined level of programming, the human-like level of artificial intelligence, constrains the design of the sensory monitors and the interface circuitry associated with the visual RRC-system. The visual RRC-system has a high level of visual intelligence never before programmed into a robotic machine.

Overview of the Three Major Steps in the Design of an RRC-Humanoid Robot

Major Step 1 includes the defined level of intelligence

A human-like level of intelligence is achieved when the signals and/or visual patterns are a) a high fidelity 3-dimensional (3D) representation of the objects present in the FOV of the recording monitor, b) are constantly monitored throughout the operational lifetime of the visual system, c) are fully related and correlated and internalized into the self-knowledge Nodal Map Module, and d) are fully trained to move body, limbs, or activate sound generators so that different actions (or the addition of visual stimuli, sounds, smells and tastes) differentiate, distinguish, identify and recognize the location and character of 3-dimensional forms and shapes, and the different colors and textures of all the objects in the FOV. Note regarding defined levels of AI: When the defined level of human-like intelligence is achieved by the visual RRC-recording monitor, the robot is defined to have, by definition, a robotic "visualization" capability, a robotic visual awareness capability, a robotic "seeing" capability, and to the degree that relational programming is performed, a robotic capability to "comprehend" the visual objects present in the FOV of the recording monitor.

Major Step 2 includes the design of a human-like interface

A human-like interface requires that the design of the optical apparatus (described in steps 1 and 2 below) be human-like, and that the sensory system, the interface, and the RRC can "identify", "recognize" and "comprehend," as defined herein, (steps 3, 4. 5 and 6 below) the following:

a) The rainbow of colors between the 4000 Angstrom—purple and the 8000 Angstrom—red, b) All objects in the field of view of the robotic system, and c) All shapes and forms of the 3D-objects and colors in the field of view of the robotic system, in such a manner so as to enable the robot to manipulate, navigate, and/or respond to all colors and shapes.

d) In addition, the interface must be designed so that the images falling on the controller are scaled and calibrated so that they represent a high fidelity picture of the 3D objects present in the FOV of the robotic system.

Major Step 3 includes programming-proof that the RRC-system has achieved human-like high IQ levels of AI.

Finally it is necessary to prove that the robotic system may indeed identify, recognize, and comprehend the signals modified by the interface and presented to the RRC. This proof is obtained by behaviorally training-programming the RRC-system to actually identify, recognize, comprehend, and vocalize a response to the signals described in the steps outlined above. This includes the activation of the verbal-phoneme sound generator and/or movement of the robotic body or limbs so as to verbally distinguish and discriminate, or physically manipulate and respond in an appropriate manner to all the different sounds impinging on the auditory recording monitor.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 8 conceptually illustrates a set of example FOVs configured for the RRC-recording monitor of some embodiments of the RRC.

DETAILED DESCRIPTION

In the following sections, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Figure 4:
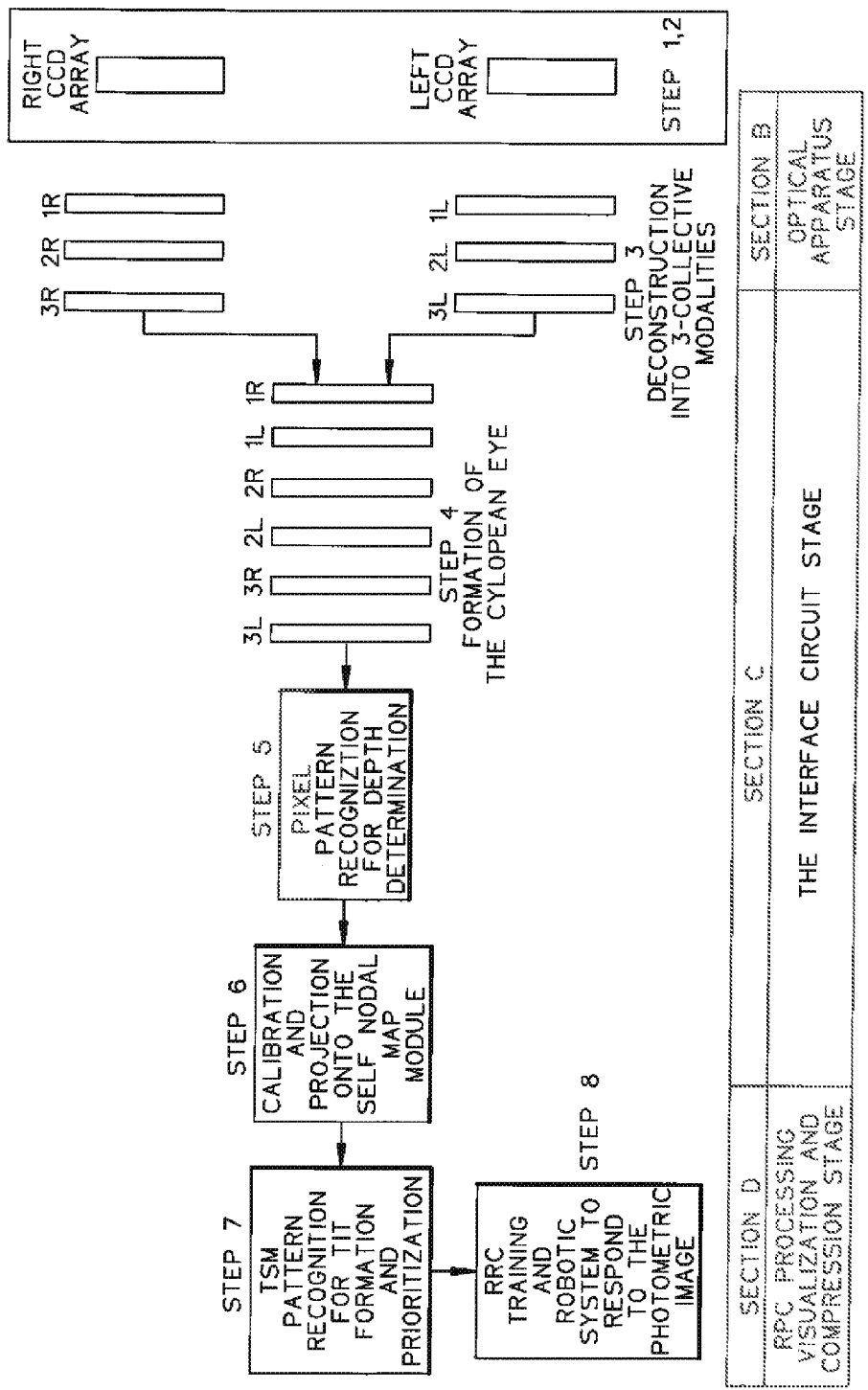
FIG. 4 illustrates a process for designing and developing a visual RRC-recording system of a visual humanoid RRC-robot in some embodiments.

A description of the operation of a RRC that supports the programming of human-like intelligence levels into the system is presented in section A). Then the description of the optical apparatus stage, The interface circuit stage, and the processing of the data stage is described as an 8-step process for the 3 stages illustrated in FIG. 4. The 3-stages consist of the optical apparatus stage presented in section B), the interface circuit stage presented in section C), and the RRC-processing stage presented in section D). Section E) describes how human-like intelligence levels programmed into a RRC-recording monitor with human-like interfaces leads to the human-like characteristic of "seeing" and "visualizing" the visual sensory image.

Section A: Operation of A RRC that Supports Programming Human-Like Levels of AI

I. Introduction to the RRC-Robot

Figure 1:
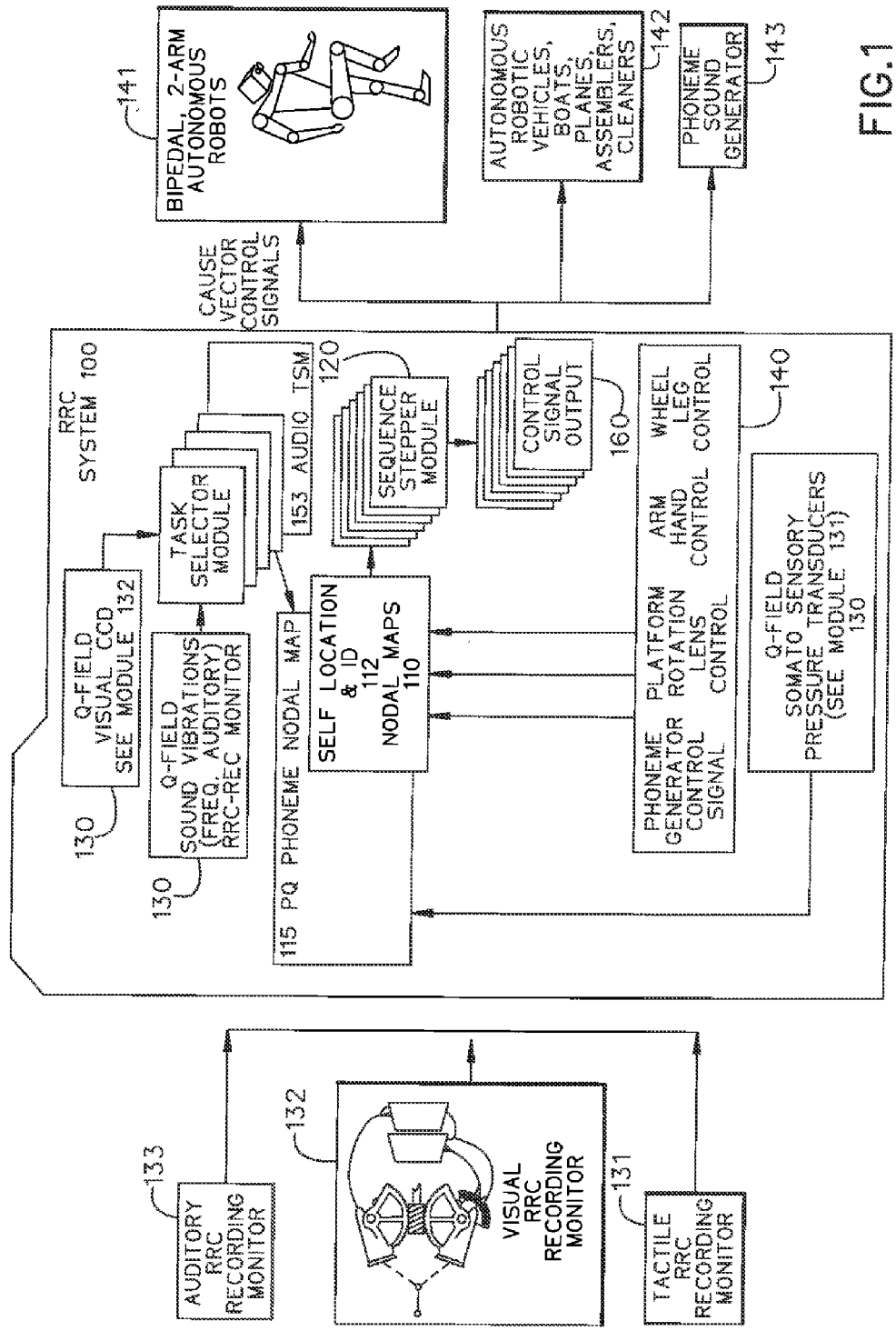
FIG. 1 conceptually illustrates a set of recording monitors included in the generalized recording monitor of a visual humanoid RRC-robotic system in some embodiments

The RRC-controller is made up of the array of Relational Correlation Sequencer (RCS)-circuits shown in FIG. 1. Control, computation and data storage are performed by relating and correlating each and every input data signal (tactile, visual, or auditory signals) with each other; and relating and correlating each and every input data signal with each and every output-control signal generated by the RRC-controller. Generally, the tactile input data, coming from pressure transducers evenly distributed around the robotic body are used to define the boundaries of the robotic body and the robotic center associated with the robotic body. The robotic center may be utilized to define a 3-dimensional (Euclidean) coordinate frame centered in the robotic body that contains the location of all pressure transducers distributed on the robotic body and limbs, and the location of all coordinates around the robotic body and the near space of the robot, defined by the flailing limbs of the robot.

The primary Nodal Map Module of an RRC-controller includes a "self-location and identification" circuit, which determines the central coordinate frame of the robot, the location of the robotic body in that coordinate frame and the position and location of the moveable flailing appendages of the robotic system.

The RRC-recording monitors shown in FIG. 1, generate the input signals to the RRC-controller. The interface circuit between the recording monitor and the RRC-controller is designed to maintain a high intelligence level based on the data present in the input signals of the recording monitor, and the processing potential of the RRC.

The human-like interface: The recording monitors and the input signals generated by them are human-like if a) the recording monitors operate like the human-like receptors that are analogous to one or more of the six human sensory receptors (tactile, vestibular, visual, auditory, olfactory and gustatory), and b) the sensitivity, intensity, and range of the signals generated by the recording monitor are specified to be the same as the sensitivity, intensity and range of human sensory receptors. The six human-like robotic-mechanical sensors are those analogous to the human tactile, vestibular, visual, auditory, olfactory, and gustatory sensors. The modality of human-like sensors is defined by the sensation resulting from sensory activation. The mechanical human like sensors must be designed to respond to the following modalities:

Tactile sensors must respond to normal pressure (ranging from light to high), temperature (ranging from warm to cold), high pressure (causing injury to the surface of the robot or pain to the human), and light flutter (senses vibrations or light breeze). In order for the tactile sensors to be human-like they must have the sensitivity and operational range of the human sensory receptors.

The vestibular sensors are the balance sensors of the robot that simulate the human inner ear sensors. The mechanical vestibular sensors consist of a set of tri-axial of hollow rings. Each ring houses a conductive ball-bearing who's position in the ring is determined by the force of gravity.

Visual sensors operate in the wavelength range between 4000-8000 angstroms. The sensors must form a 3D photometric image which is a high fidelity representation of the objects present in the FOV of the visual sensors. In order for the visual sensors to be human-like the RRC-system must be capable of "visualizing" the trichromatic 3D-photometric image and prove that it is capable of identifying, distinguishing, recognizing and comprehending all the colors, shapes, and forms of the photometric image.

Internalizing the data: When the input sensory signals are related to the self-location and identification Nodal Map Module, the sensory signals are said to be "internalized" to the robotic "self" of the system. Internalizing the data means relating it via a RCS-circuit to the self-location and identification Nodal Map Module. When the data is internalized the system gains a form of self-location and identification knowledge. Internalization of the data is required in order to perform a higher level of identification, recognition, visualization and comprehension of all input data signals. "Internalization" of the data is achieved by relating and correlating the data to the "self locating and self identifying robot," relating and correlating each and every input data signal (tactile, visual, or auditory signals) with each other, and relating and correlating each and every input data signal with each and every output-control signal generated by the RRC-controller. It is the internalization of all the input data that allows the RRC-robot to identify, recognize, visualize and comprehend the input signal.

The search engine mode of operation: The visual and tactile search engines shown in the Hierarchical Task Diagram (HTD) of FIG. 2 operate concurrently to guide the robot in the performance of the multiple tasks listed in this figure. The FIG. 2 HTD was taken from, and described in U.S. Pat. No. 6,560,512 B1, dated May 6, 2003. The visual search engine mode is designed by programming/teaching the robot to respond to viewed objects within the camera's FOV. It is a process of training the robot to move its head, visual video-camera system, and body so that the FOV-midline is determined in the self-location and identification coordinate frame of the RRC-robot, then sweep the depth of convergence along the mid-line LOS (MLOS), from the near point (6-centimeters in front of the robot) to the far point (infinity), and the sweeping motion comes to rest at a convergence point, where the 2-video cameras fixate on the nearest object crossing the MLOS.

For example, a visual multi-tasking robot with a visual system that examines the various FOVs described in Table 1, may be programmed to search for objects in the FOV-regions surrounding the robot. Each FOV (0, ±45 degrees) is searched for objects that intersect the MLOS.

In the preferred embodiment the search is conducted by sweeping the point of convergence from the nearest point of convergence (convergent angle of 45 degrees, or 6 cm in front of the robot) to the furthest point (convergent angle zero, fixation point at infinity). The search engine is used to search the external environment for Task Initiating Triggers (TIT)-patterns and obstacles that may be present along the robotic-path. The Task Selector Module (TSM), the Nodal Map Module and the Sequence Stepper Module (SSM) are the primary processing elements used to detect TITs present in the input sensory signals.

The circuits that perform identification, recognition, and comprehension of the 3D-photometric image: The visual search engine is used to search the "self-location and identification" coordinate frame environment of the robot for visual-image patterns that will be recognized by the RRC as Task Initiating Triggers, (TIT)-patterns that activate any of the tasks listed in the FIG. 2-HTD. Each of the prime level tasks, shown in FIG. 2, has a programmed Task Selector Module (TSM) associated with it. The dominant electronic component of each TSM is a pattern recognition circuit that is programmed to recognize and prioritize the TIT-pattern detected by each of TSMs as they operate on each of the input Nodal Map Modules. The Nodal Map Modules, subsystem 110 in FIG. 1, are part of the array of the self-location and identification Nodal Map Modules that make up the RRC-block diagram, system 100, shown in FIG. 1. System 100 and subsystems 110 to 160 are described in U.S. Pat. No. 6,560,512 B1 Dated May 6, 2003, and are shown again in FIG. 1 of this disclosure. Those descriptions are fully applicable to this disclosure and are utilized extensively in section-D (The RRC-processing stage).

Figure 3:
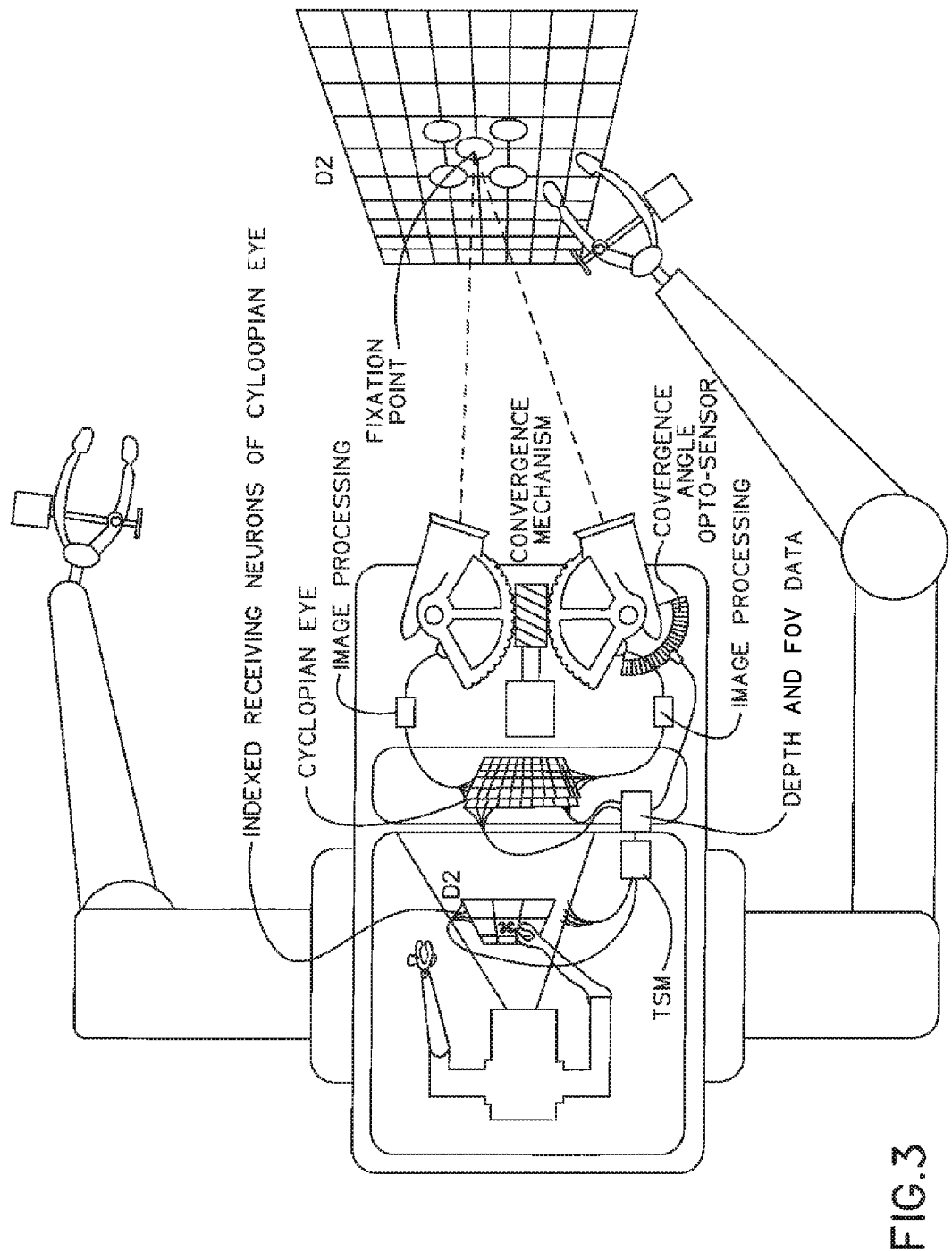
FIG. 3 conceptually illustrates an optical apparatus of the visual RRC recording monitor of the RRC in some embodiments.
Figure 6:
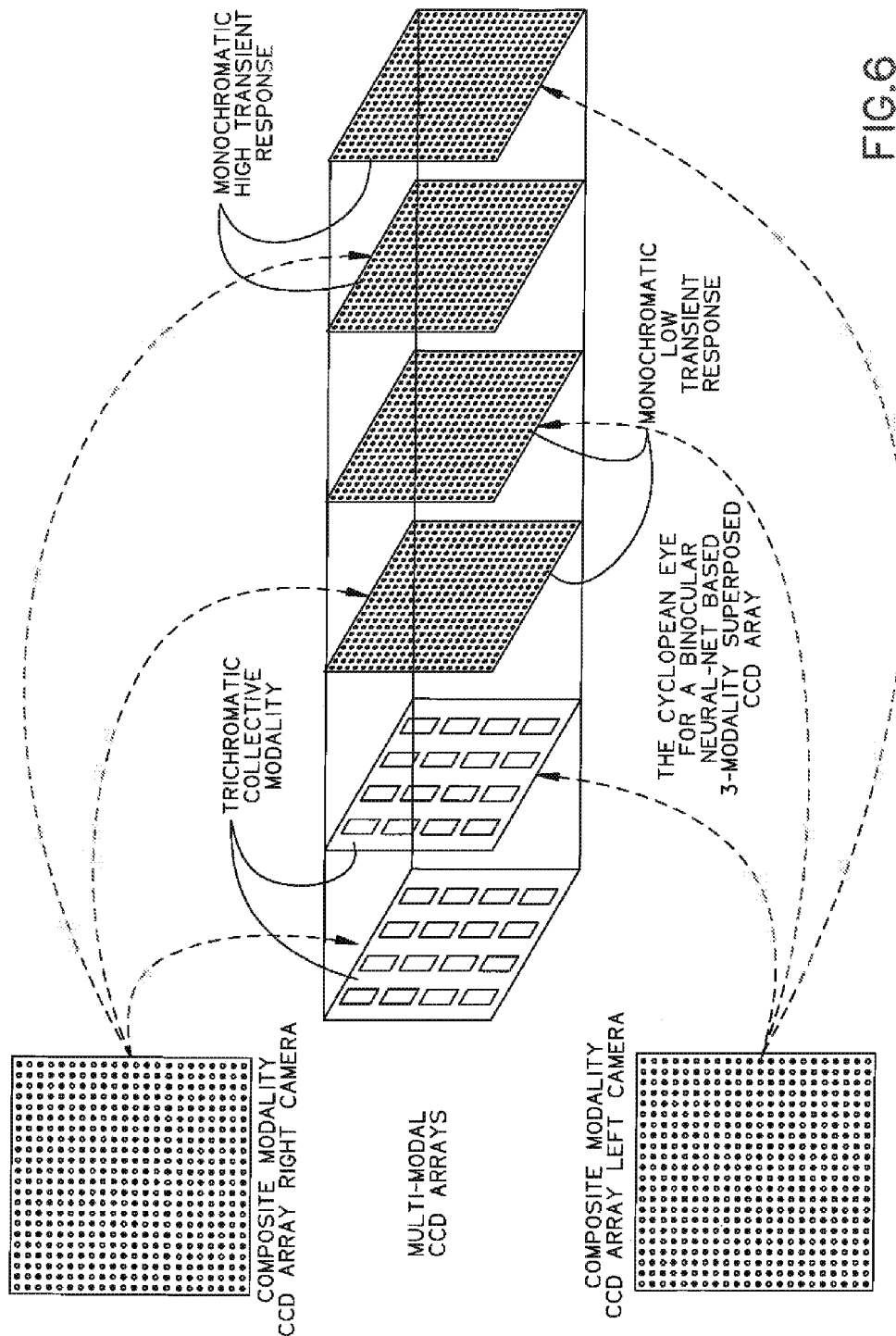
FIG. 6 conceptually illustrates a Cyclopean eye formed by two multi-modal CCD-arrays in some embodiments of the RRC.

Subsystems 132, shown in FIG. 1, and the interface-mounting of the visual RRC recording monitor shown in FIG. 3, are unique to this disclosure (Subsystem 132 is shown in detail in FIG. 3). Subsystems 301 is shown in FIG. 3, whereas the operation of the convergence mechanism, is described in steps 1 and 2 of FIG. 4. Subsystems 600 and the decomposition of the visual input signal into collective modalities is described in FIG. 6. The Cyclopean eye for a binocular neural net based 3-modality superposed CCD-array is also shown in FIG. 6.

Figure 2:
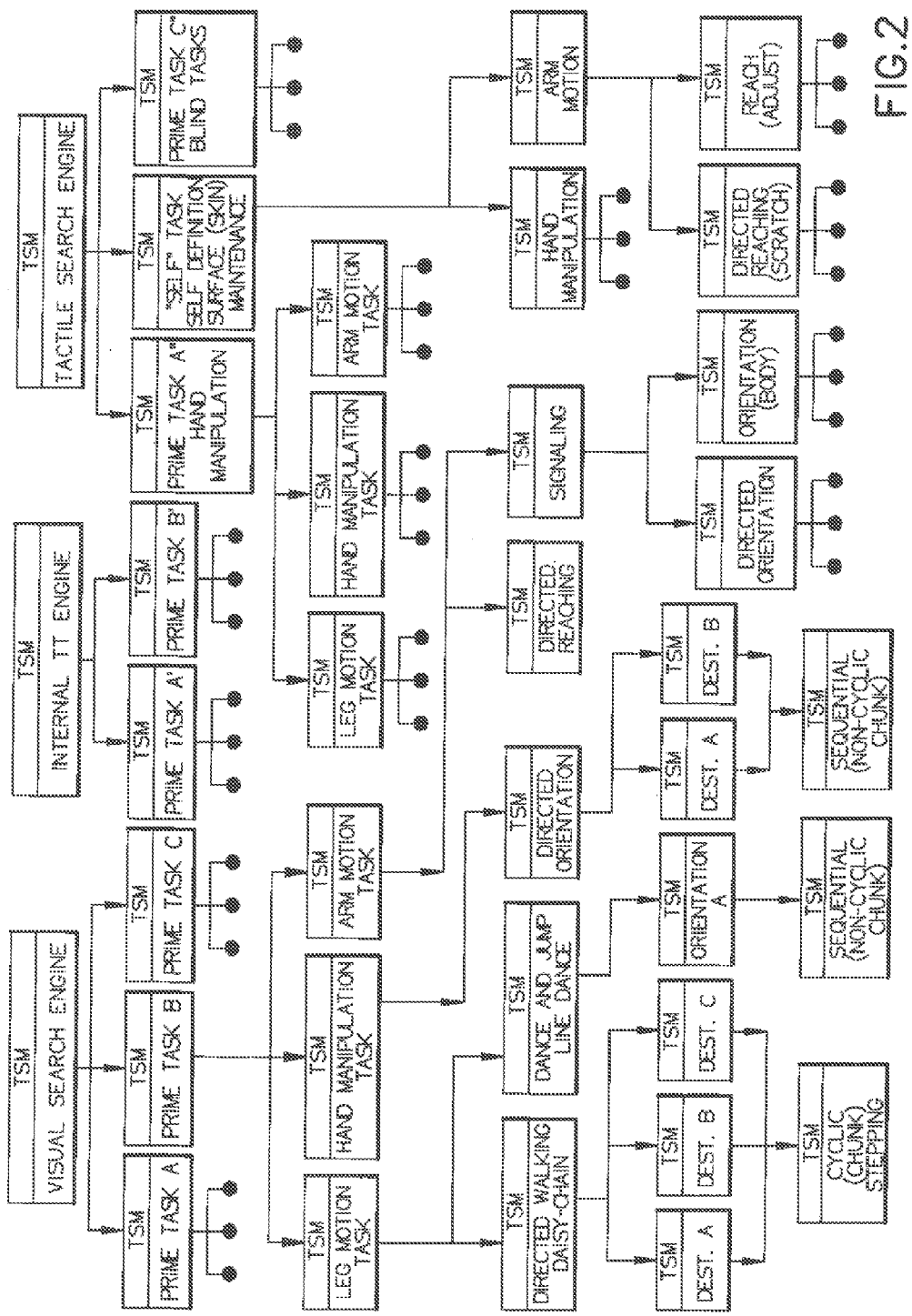
FIG. 2 illustrates a schematic of the procedural HTD in which the TSMs of the procedural search engines form a procedural memory system with the RRC in some embodiments.

The total collective of TSMs shown in FIG. 2 form the procedural memory system of the visual RRC-system. The programming/training of the visual RRC-robot is a process of training the pattern recognition circuits of each TSM associated with each task, to recognize, identify and prioritize input-signal TIT patterns that initiate the lower level tasks shown in the figure. The training-programming of the TSM-procedural memory system is described in U.S. Pat. No. 6,560,512 B1, dated May 6, 2003. The processing of the visual input signals in the interface circuit of the RRC-recording monitor is described in steps 3-6 in FIG. 4. Step 5 describes pixel-pattern recognition for depth determination. Step 6 describes the calibration and projection of the image onto the self-location and identification Nodal Map Module. The RRC training of the robotic system is described in steps 7, and 8 of FIG. 4. Step 7 describes the TSM-pattern recognition for TIT formation and prioritization, and step 8 describes the RRC-training of the robotic system to respond to the high fidelity 3D photometric image.

Note that the programmed/trained TSMs associated with the tasks in FIG. 2, represent a memory system within the controller that remembers the procedure for performing the various subtasks listed in the HTD.

A procedural memory system within the RRC: Learning and memory is generally classified as procedural (or reflexive) if the learning or memory involves motor skills, and declarative if the learning or memory involves verbal skills. In the patented volitional multi-tasking RRC-robot, procedural TITs operate in the muscle joint Nodal Map Module, and procedural memory is the basis for all the control functions of the somatic motor system. FIG. 2 shows the TSMs associated with the procedural memory system. The programmed/trained TSMs shown in FIG. 2, give the robot the capability to "remember how" to perform all the mechanical displacement subtasks listed under the prime level task. (e.g. a mail delivery robot "remembers" via the set of prioritized TITs, the procedure for delivering mail). The design of the procedural memory capability of the RRC-robot was claimed in RRC-patent U.S. Pat. No. 6,560, 512 B1 dated May 6, 2003.

Section B—the Optical Apparatus Stage (Steps 1 and 2)

I. The Optical Apparatus

The optical apparatus for the formation of a 3D-photometric image is shown in FIG. 3. The robotic eyes are two video cameras with 2 identical focal length camera lens' and two identical color detecting arrays of Charge Coupled Devices (CCD) (or CCD-arrays) located at the film-region of the camera. A convergence motor and worm gear, shown in FIG. 3, is used to point the 2-cameras at a convergence point located on the mid-line LOS (MLOS). The depth of the convergence point is measured by a convergence rotational sensor and limits are defined by opto-sensors.

Figure 5:
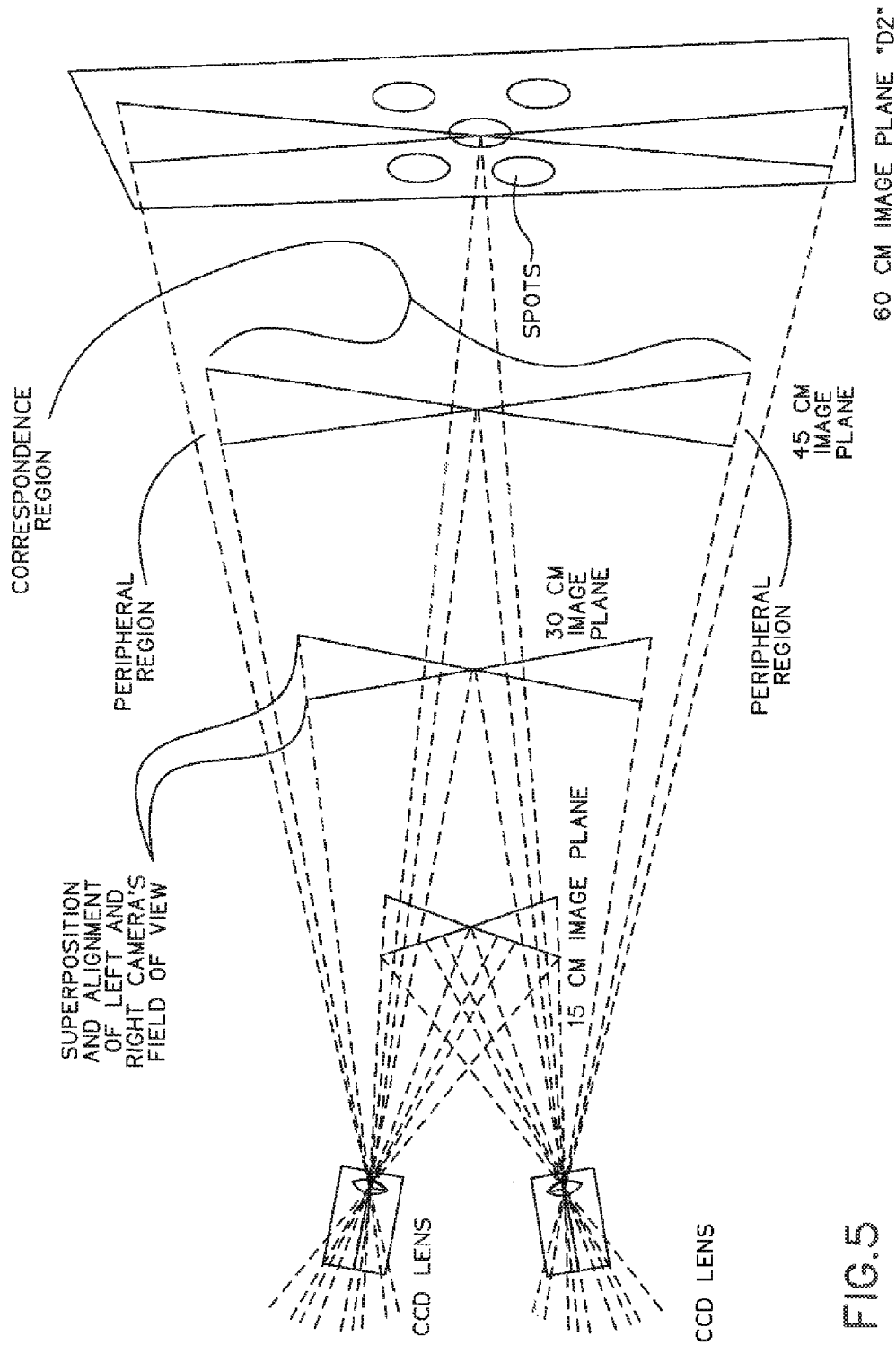
FIG. 5 conceptually illustrates an example of superposition and alignment of right and left video camera field of view (FOV), with 4-image planes where the right and left video cameras are convergent on a midline LOS at depth distances of 15, 30, 45, and 60 centimeters.

II. Step 1. Define Image Planes Located at Each Convergence Point Along the MLOS FIG. 5 shows an example of four-image planes where the 2-video cameras are convergent on the mid-line-LOS at depth-distances of 15, 30, 45, and 60 centimeters. At each convergence point, two image planes perpendicular to the LOS of each camera are shown in the Figure. The areal extent of the right and left camera CCD-arrays determine the areas covered by the image planes and the FOV of each image plane. At each convergence point the two image planes are superposed and aligned so that the central portion of the FOVs correspond to one another, and the right peripheral portion of the FOV is unique to the left camera, whereas the left peripheral portion is unique to the right camera.

Note that with the two cameras convergent at a single point, a) The area covered by the FOV of each camera corresponds to the area covered by the sensors of each CCD-array. b) There exists a one to one correspondence between a spot of light located on the image plane and a CCD-sensor located on the CCD-array (see the image plane at 60-centimeters in FIG. 5. c) The retinotopic organization of the images on the image plane correspond to, and are proportional to the images on the CCD-arrays, and d) The correspondence and proportionality of the 2-images is determined by the alignment and convergence of the 2-video cameras.

III. Step 2. Obtain the Image Pixel-Signals from the Left Camera-CCD-Array and the Right Camera-CCD-Array The correspondence of the image-planes is lost as the 2-images are de-constructed into separate CCD-arrays signals. However this correspondence and alignment re-occurs in step 4, the formation of the Cyclopean eye.

Section C—the Interface Circuit Stage (Steps 3, 4, 5, 6)

This part describes the design and processing of the data in the interface circuit stage. It includes the formation of the Cyclopean eye, depth determination for all pixels, the formation of the 3D photometric image, and the calibration and projection of the 3D-image onto the 3D-coordinates of the self identification and location coordinate frame present in the RRC-Nodal Map Module (steps 3-6 in FIG. 4). The Cyclopean eye is formed in steps 3 and 4, whereas the 3D-photometric image and calibration of the image with the Nodal Map Module is performed in steps 5 and 6.

I. Step 3. Deconstruct the Corresponding Image Planes into Separate CCD-Array Data Streams and De-Construct Each CCD Data Stream into Two or More Separate Collective Modalities A multi-modal set of collective modalities is designed into the RRC-recording monitor. For example, three collective modalities are shown in each CCD-array illustrated in FIG. 6. Each collective modality of the Right CCD-array and the Left CCD-array maintains the retinotopic organization of the R-CCD-array and the L-CCD-array, respectively.

The CCD-array of most color cameras is bimodal in the following manner: a) A low resolution color collective modality, with a Bayer red, green, blue filter covering each set of 4-pixels-CCDs, and b) a high resolution monochrome collective modality wherein the data output of each individual CCD of the CCD-array generates a monochromatic pixel-image with 4-times the resolution of the color signal CCD-array.

In FIG. 6, the 3 collective modalities devolve into 3-pairs of binocular layers in the Cyclopean eye, as follows: a) A trichromatic collective modality: The trichromatic modality is shown as squares, and each square is made up of 4-different color photo-sites (the same as those illustrated in FIG. 6). b) Monochromatic high-resolution low transient response photoreceptors modality: The transient response of the photoreceptor reaches an intensity peak during the first-activation frame period, then drops to zero by the fourth subsequent frame period. The resolution is 18-times that of the trichromatic collective modality (18 photo-sites per trichromatic photo-site, shown as black dots in FIG. 6). When the image is steady on the CCD-array, this modality is engineered to integrate the image over 3 or 4 frame periods. And c) Monochromatic high-resolution high transient response photoreceptors modality: The transient response of the photoreceptor reaches an intensity peak and drops to zero during the first-activation frame period. The resolution is 18-times that of the trichromatic collective modality (18 photo-sites per trichromatic photo-site, shown as black dots in FIG. 6), and this collective modality is engineered to track image motion on a frame-by-frame basis.

Note that each defined collective modality leads to improvements, degradations, advantages and disadvantages in the detection of the nature of the objects that are displayed in the RRC-controller as a 3D-photometric image. And that multiple collective modalities operating simultaneously may lead to a system that accentuates all the improvements and advantages of each collective modality without suffering the degradations and disadvantages inherent in each individual collective modality. For example, the trichromatic collective modality (described in a) above) operating with a slow transient response displays a image that accentuates the persistence and brilliance of color of the object at the expense of lower resolution and temporally slower transient response. The addition of a monochromatic high resolution, low transient response, described in b) above, increases the resolution and persistence of the image at the expense of lower color response and temporally slow transient response. Note that the three illustrated collective modalities (described in a), b), and c) above), operating simultaneously, leads to the detection of a high persistence, brilliant trichromatic color, high resolution image with a temporally fast transient response to detect motion.

Other collective modalities that improve the detection of objects in a 3-dimensional space, such as edge detection and motion sensing may be incorporated into the Cyclopean eye and extracted from the retinotopic collective modality by the processing procedure described in step 5.

II. Step 4: The Cyclopean Eye

The single multi-modal array of collective modalities defined as the Cyclopean eye is shown in FIG. 6. The collective modalities are arranged so as to maintain the binocular correspondence of the image planes shown in FIG. 5, and the retinotopic organization of the right and left camera's CCD-arrays.

The Cyclopean eye of the system is designed by projecting the collective modalities of the right and left CCD-camera array onto a single overlay of multiple superposed retinotopic collectives. Each layer of the Cyclopean eye is made up of receiving neurons of a neural network that maintains the retinotopic organization of the CCD-arrays.

FIG. 6 shows the distribution of the 3-modality, 6-layered system originating from the CCD-receptors on the right and left camera CCD-array. The Cyclopean eye described in the preferred embodiment is made up of the 6-collective modality layers shown in FIG. 6. As described in the previous Step 3, the detection capability of the system may be greatly improved by superposing additional collective modalities in the Cyclopean eye. (Examples of improvements that may be added to the system are: persistence, resolution, color brilliance, edge detection, motion transient response detection, low light level detection, shadow/motion detection etc.)

Steps 5 and 6 calibrate and project the 3D-photometric image onto the 3D-coordinates of the self identification and location coordinate frame present in the RRC Nodal Map Module.

III. Step 5: Depth Determination and Formation of a 3D-Photometric Image: Visual Cues In order to view the 3D-image in the coordinate frame in which the robot is operating, the RRC-robot is programmed to converge the 2-cameras on the nearest objects located at the fixation point along the mid-line LOS. At the fixation point the following processing is performed during each frame period: a) The depth of the fixation point is determined by the convergence angle measured by the opto-angle sensor shown in FIG. 3. b) The two image plane-data recorded on the Cyclopean eye is projected onto a planar retinotopically organized array of data points located in the self-location and identification coordinate frame of the nodal Map Module (D2 in FIG. 3). c) The planar array of data points form the input to a planar neural network. The image planes and the projected planar array-neural network is illustrated as D2 in FIG. 3.

Only the indexed-fixation point receiving neurons at the center of the (planar array) neural network at D2 are exhibited at the correct depth within the self-location and identification coordinate frame. Note that the correct depth is derived from opto-angle sensor data. Nearby pixels that are offset from the fixation point may represent objects that are located at distances further or nearer than the depth of the fixation point. The binocular disparity-dispersion between corresponding offset pixels, located on the two image planes and offset from the fixation point, is the first visual cue for learning the depth-location of offset neurons of the neural network located at point D2. Note that the binocular dispersion at the fixation point is zero.

The robot must learn, using visual cues discussed in the next section whether the depth of the offset neurons are located at greater or smaller distances than the depth of the fixation point.

Formation of a retinotopic depth collective modality within the RRC: Determination of the depth of an object that is offset from the fixation point. An internal retinotopic depth collective modality may be formed in the microprocessor based portion of the controller by using the visual cues similar to the ones listed by David Marr in his book titled "Vision", published in 1962 by Freeman Press (specifically, in this book, Mr. Marr showed that locating the depth of offset neurons by dispersion measurements only, is an "ill-posed" problem, that is a problem that does not have a unique solution. Mr. Marr also showed that visual cues that are converted into mathematical constraints, need be added to the binocular dispersion data in order to obtain a unique solution). During each frame period, the internal depth collective is formed by applying the visual cues in the form of mathematical constraints as inputs to the neural network (located at D2 in FIG. 3). Constraint satisfaction of visual cues for the visual RRC-recording monitor is implemented by a 3-step process, described as first, second, third:

First, a generalized visual cue that identifies the coordinate frame and the objects likely to be found in that coordinate frame is applied to the planar array located at point D2 in FIG. 3. An example of a generalized visual cue is illustrated in FIG. 7 and described in Section C—step 7.

Figure 7:
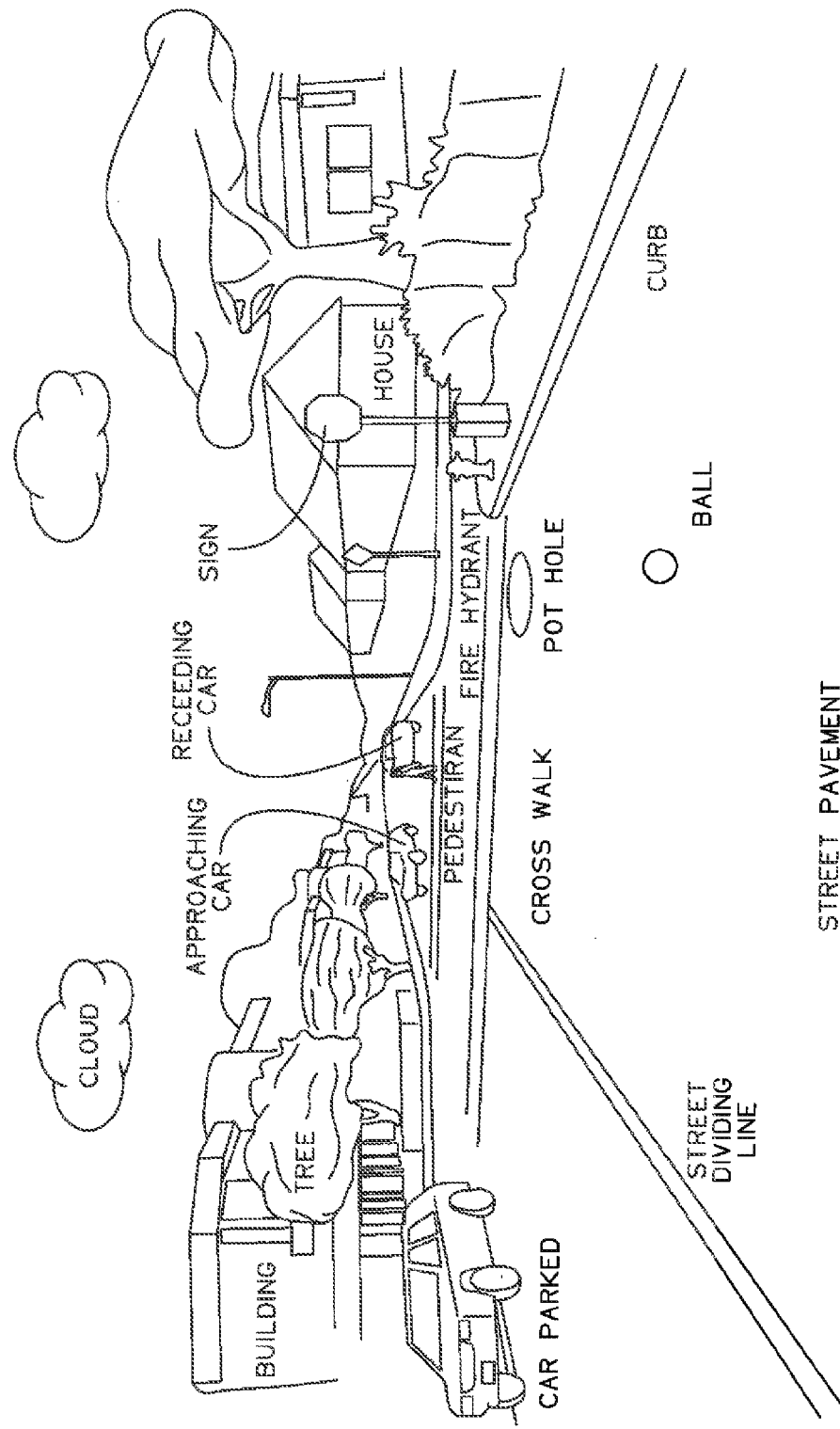
FIG. 7 conceptually illustrates an example of a visual photometric image obtained by the RRC-visual robot constrained to move through a paved urban street.

Second, within the image planes at point D2, groups of pixels are identified as two types of objects; objects that delineate the coordinate frame (such as curbs and centerlines shown in FIG. 7) and objects that are likely to be found within that coordinate frame (such as pedestrians and cars also shown in FIG. 7).

Third, the system is trained to calibrate the depth of objects represented by groups of offset neurons (on the image planes located at D2 in FIG. 3), with the 6-visual cues listed below that determine the depth of groups of offset neurons that represent objects.

The 6-mathematical visual cues used in the visual RRC-recording monitor are as follows:

1. The measured binocular dispersion of objects defined by groups of pixels and their indexed location on the 2-corresponding image planes (Stereopsis). Note that binocular dispersion increases with offset location and decreases with depth.

2. Measure of the relative size of an object. Note that an object that is further appears smaller on the CCD-array than the same object placed in a nearer location.

3. The measured color-shape of objects perceived by one camera should correspond to the color-shape of the other camera. The 2-corresponding objects have to represent a single position at a fixed distance.

4. Determine that an object that obscures a portion of another object is nearer than the obscured object.

5. Measured or detected objects are first identified in step 1 and 2 of the 3 step process. If the first 2 steps are unsuccessful, the activation pattern may be identified as "matter," which is assumed to be cohesive and smooth. That is, neighboring patches of the world tend to lie on the same smooth surface. Or a LOS must end up on a surface in the world that is not drastically closer or further than the surface hit by a neighboring LOS.

6. For an unidentified splotch of activation, one may measure whether the LOS from both cameras end at a splotch on one, and only one, surface in the world (LOS of one camera should not end at two or more surfaces).

The internal depth collective is designed to learn the correct depth-location of offset neurons by applying the fore-mentioned visual cues detected and processed during a sequence of frame periods, rather than shifting the fixation point to each offset neuron in order to determine its depth-location.

IV. Step 6. Calibration and Projection of the 3D-Color Image onto the Tactile Self-Location and Identification Coordinate Frame During each frame period the neural network (located at D2 in FIG. 3) has been programmed to project the indexed photometric pixel data at the fixation point to the depth determined by the opto-angle sensor, and project the indexed photometric pixel data of all offset locations to the depth determined by the 3-step process enumerated above. When all the photometric pixel data are projected to the proper indexed depth, a 3D-photometric image is formed within the coordinate frame of the self-location and identification Nodal Map Module. Note that the 3D-photometric image is a virtual image, an "illusion" inside the RRC that is a high fidelity representation of the 3D-objects present in the FOV of the visual system. The 3D-photometric image/"illusion" consists of image pixels distributed in the 3D-self-location and identification coordinate so as to form the high fidelity representation of real objects present in the FOV of the system. (Note also that the robot may validate the depth of pixels and objects located at offset-points by going into a search mode wherein the mid-line LOS is pointed to an offset location and the cameras converge and fixate on the offset object and thereby determine the depth of the object) Section D—the Rrc Processing Stage: Training the System to Respond to the 3D-Photometric Image (Steps 7 and 8)

I. Step 7. TSM-Pattern Recognition for TIT-Formation and Prioritization

The visual cue constraints-satisfaction procedure described in Step 5, generates a set of visual-photometric objects located in the coordinate frame in which the robot is operating (the centralized "self-knowledge" coordinate frame of the system). In order to recognize and identify the objects, additional constraints, deduced from the environment-coordinate frame are applied to the system. The robot may be constrained to operate on the surface of the earth, or under the ocean waters, or fly through the atmosphere or deep space. In each case the visual objects observed by the robot are constrained by the environment in which the robot is operating. These constraints are important for teaching the robot how to recognize a 3D-photometric image by the pattern recognition and identification programming procedure described in step 5 of this disclosure. For example, visual photometric images of a visual humanoid RRC-robot constrained to move on the surface of the earth through a paved urban street, are shown in FIG. 7. The 3D-photometric image may be de-constructed into the following distinguishable and identifiable components shown in FIG. 7:

The stationary components consist of a) the smooth surface along which the robot is moving, b) the characteristics of that surface (color/shade, lines and shapes drawn on the surface (centerlines, pedestrian crosswalks), driving directions painted on the surface), potholes, and rough spots on the surface, c) Stationary raised objects present on the surface that are characteristic of the surface and may be used as a guide for the robot (curbs or barriers that delineate the smooth surface, curbed islands, sidewalks). d) Stationary large objects in the FOV that are part of the surface. (Fire hydrants, trees, lamp posts, stop signs, warning signs).

The moving components consist of a) moving vehicles moving in the same/opposite direction of the robot, b) any pedestrians, carriages, carts, wheelchairs, etc located anyplace in the FOV, and c) any moving animals, or obstacles that move into the FOV of the robot.

The pattern recognition process begins with the visual cues that convert two 2D-images into a photometric 3D-image. The coordinate constraints enumerated above are added to the 3D-image formation process and each of the objects listed as an identifiable component is categorized in terms of its function in possibly becoming a TIT. For example, the curbs or lane demarcation lines, shown in FIG. 7, have the function of guiding the motion of the robot so that it travels within the boundary of the curbs/lanes. These curb/lane lines are low (near zero) priority TITs as long as the robot is centered in its lane. The priority of the curb/lane-line object increases as the robot moves closer to the lane-line/curb. If the curb is a barrier and the robot is headed towards a crash, the priority of the observed object becomes very great and the robot generates a TIT that guides it away from the barrier.

II. Step 8. Training the Robotic System to Respond Intelligently to the 3D-Photometric Image (Operation of the TSM, SSM, and CSM)

Programming-teaching the robot to respond to the visual 3D-photometric image is a process of training the robot to move its head and body to orient the MFOV in a determined direction, and then sweep the depth of convergence from 6-centimeters in front of the robot to infinity. As described in the RRC-disclosure (U.S. Pat. No. 6,560,512 B1), the response of a visual RRC-robot is determined by the Hierarchical Task Diagram (HTD), the top level specification of the system that identifies the TIT-objects, their priority levels, and the tasks associated with them. The Task Selector Module (TSM) is programmed a) to perform image pattern recognition and identification of objects, b) prioritize the TIT assigned to each object as a function of distance and collision course with the object and c) select during each frame period the Task Initiating Triggers (TITs) present in the incoming signal (See the RRC-patent disclosure). For example, a standard automobile may be outfitted with a visual humanoid RRC-robot that operates as an automobile driver that is programmed to recognize all the coordinate objects listed in FIG. 7. Note that in this case the standard automobile is modified as follows: a) An RRC equipped with a binocular video-visual RRC-recording monitor must be added to the system. b) The exterior peripheral surface of the automobile needs to be covered with pressure transducers in order to support the definition of the self-location and identification robotic coordinate frame. c) A visual humanoid RRC-robotic driver is added to the system. The active parts of the robotic driver consists of a robotic foot that presses on the brake petal or gas pedal, robotic arms for steering the automobile, and a rotating visual system to sweep the FOV of the video camera system.

Such an RRC-robot may be designed to safely drive a vehicle in a lawful manner on any city street full of pedestrian and vehicular traffic. The priority levels of all objects in the field of view are programmed into the HTD and the TSM. The TSM a) transmits the photometric data of all detected obstacles via the internally generated retinotopic depth collective, to the indexed 3D-locations of the Nodal Map Module, and b) the priority levels of 3D-photometric obstacles are determined. Within any high level task objective that determines the overall goal of the robot, the 3D-photometric obstacles are designed to be mid level priority tasks that do not change the high level task objective. Instead, within each high level task objective, the Sequence Stepper Module generates a pre-planned trajectory so as to avoid the obstacle while performing any of the higher priority level tasks. (U.S. Pat. No. 6,560,512 B1)

It is also possible for the robot to distinguish and respond to different colored objects as determined by the trichromatic visual system. Training the robot to distinguish different colors is accomplished by programming the robot to respond to differing TITs for different colors. The TITs assigned to each color-hue may be used to perform any motor task designed into the HTD, including sound phoneme generator tasks that verbally describe the object and the color-hue of the object.

Section E—Robotic Visual "Seeing:"

Disclaimer Regarding Human-Like Subjective Experiences.

To avoid philosophical discussions, it is important to note that the authors do not claim that the intelligent robots, with subjective data programmed into them, have the same subjective experience as a human does in 'feeling' the tactile data, 'seeing' the visual data, 'hearing' the auditory data, etc. The data is called subjective because it is programmed into the self-identity/self-knowledge coordinate frame of the robot. The robot's internal reaction to the data, or whether the robot has an internal reaction is not known to the authors. However, the robots external reaction to the data is experientially, that is behaviorally programmed to be identical to human behavior. That is, the robot behaves as if it feels the tactile data, as if it sees the visual data, and as if it hears and understands the auditory data. That is why we speak of robots with 'experiential feeling,' 'experiential seeing,' 'experiential hearing,' 'experiential smelling,' 'experiential tasting,' and 'experiential balancing' capabilities.

Robotic Visualization or "Seeing Knowledge" of the Photometric Image.

Visualization is a form of knowledge; a level of intelligence programmed into the system. Visualization is commonly called "seeing knowledge." Visualization or "seeing" knowledge is obtained by internalizing all the different colors, shapes forms and textures into the self-knowledge Nodal Map Module and learning to move the robotic body, limbs or sound generators so as to distinguish manipulate and respond to the different colors, shapes, forms and textures of all the objects in the FOV. The RRC is trained to perform 3D-real time video camera visualizations of a 3D-photometric image by performing manual dexterity manipulation tasks on the visualized photometric-objects and locomotion tasks guided by the visualized photometric-objects. Based on the visualized data and the relationship of that data to the self-location and identification coordinate frame, a RRC robot may be taught to perform all locomotive and limb manipulation tasks that a human may perform and that range from driving autos to threading a needle.

Robotic Visual Sensation of the Photometric Image.

With the caveat presented in the disclaimer noted above the authors would like to define 'robotic visual sensation' so that it is identical to 'robotic visualization' of the photometric image, in terms of the trained robotic behavior of the system. The robotic system is said to have the "sensation" of the photometric image when the level of intelligence of the system with respect to the photometric image reaches the "seeing knowledge" generally displayed by humans. The robotic sensation itself is a form of seeing knowledge (subjective AI) of the 3D photometric image inside the controller. The pixels making up the 3D-photometric image are a high fidelity representation of the 3D-objects located in the FOV of the cameras. In this sense, the photometric image is a virtual image, a mirror image of objects in the FOV of the visual system. The virtual image is an "illusion" located within the controller, and the "robotic sensation" represents knowledge of the photometric "illusion." The 3D-photometric-illusion is calibrated with, and related to real objects in the FOVs surrounding the robot, so that no other measurements need be obtained in order to manipulate real-objects or avoid real-obstacles while driving or walking through the 3D-photometric-illusion space.

Section F—Higher Levels of Artificial Intelligence: Improvements in Visual Detection Associated with the Visualization Level of AI Improvements in visual detection occur concurrently with a) the electronic conversion method and b) with higher levels of intelligence programmed into the system.

Improvements associated with a) the electronic conversion method: The electronic conversion method refers to the methodology whereby the signals and/or visual patterns are electronically converted to a high fidelity 3-dimensional representation of the objects present in the FOV of the video-visual recording monitors. In this case the fidelity of conversion is achieved by parametric improvements in the resolution (high), color sensitivity (trichromatic), transient response (low for persistence and high for motion detection). Note that each defined collective modality leads to improvements, degradations, advantages and disadvantage in the detection of the nature of the objects that are displayed in the RRC-controller as a 3D-photometric image. And that multiple collective modalities operating simultaneously may lead to a system that accentuates all the improvements and advantages of each collective modality without suffering the degradations and disadvantages inherent in each individual collective modality. Note that the three illustrated collective modalities (described in FIG. 6), operating simultaneously, leads to the detection improvements and advantages of high persistence, brilliant tri-chromatic color, high resolution image with a temporally fast transient response to detect motion. The Cyclopean eye described in the preferred embodiment is made up of the 6-collective modality layers shown in FIG. 6. As described in Step 3, the detection capability of the system may be greatly improved by superposing additional collective modalities in the Cyclopean eye. (Examples of improvements that may be added to the system are: persistence, resolution, color brilliance, edge detection, motion transient response detection, low light level detection, shadow/motion detection etc.)

Improvements associated with b) higher levels of intelligence programmed into the system: Higher levels of intelligence are programmed/trained by relating, correlating, internalizing, and mechanically moving body and limbs so as to differentiate objects, colors, shapes, textures and motion of objects and thereby develop a "visualization" capability, a "visual awareness" capability, a "seeing" capability or generally obtain a visual sensation of the "image" that is a high fidelity representation of the real objects in the FOV that gave rise to that image.

Higher levels of identification recognition and comprehension may be applied to any sensation by relating the sensation to a larger number of related patterns and signals obtained by all the sensors. For example, the sensation resulting from visualization and comprehension of the image allows the robot to a) reconstruct and distinguish the characteristics of a low resolution or partly obscured sensation-image by accessing data stored in the memory storage system of the RRC robot. b) Distinguish whether the image presents a threat or is benign (such as a dangerous gun versus a toy gun). And c) distinguish the magnitude of any threat or obstacle by means of the priority level assigned to any recognized image. For example high levels of artificial intelligence may be achieved by use of the awareness of feedback data from joints and reaction forces from the ground when training the robot to walk, run or dance like a human.

In general, higher levels of identification, recognition, awareness and comprehension applied to the visualization capability improves the "seeing-experience" and leads to greater knowledge of how to respond to the robotic sensation.

Section G—Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
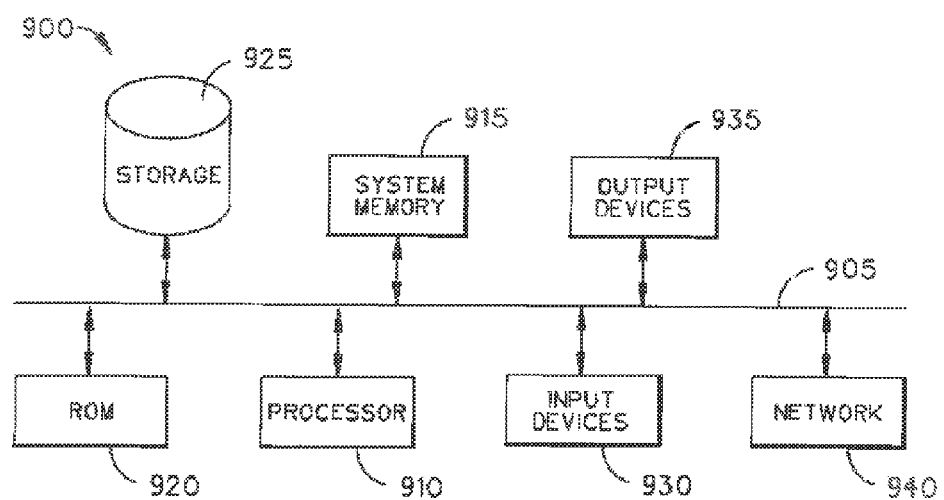
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing devices (also called "cursor control devices"). The output devices 935 display images generated by the electronic system 900. The output devices 935 include printers and display devices, such as cathode ray tubes (CRT) or liquid crystal displays (LCD). Some embodiments include devices such as a touchscreen that functions as both input and output devices.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. One embodiment disclosed herein is for a visual RRC-humanoid robot programmed to achieve human-like levels of visual artificial intelligence (AI). The Visual RRC-humanoid robot was described in a provisional application submitted to the patent office on Apr. 15, 2013 (provisional patent No. 61/812,028-see related applications), which in turn is built upon a Relational Robotic Controller (RRC) patent (U.S. Pat. No. 6,560,512 B1 dated May 6, 2003), by adding; a) a Visual Recording monitor, b) a new Interface Circuit between the visual recording monitor and the RRC, and c) a new visual programming capability that gives the robot a human-like intelligent visualization capability. Although preferred embodiments are disclosed herein, many variations are possible which remain within the concept, scope, and spirit of the invention; these variations would be clear to those skilled in the art after perusal of this application.

In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Thus, one of ordinary skill in the art would understand that the invention is not to be limited by the foregoing illustrative details, but rather is to be defined by the appended claims. In the claims section the authors will stress claims that are inherent to the newly added subsystems, and avoid redundant claims associated with claims made in the previously patented disclosure. However, some degree of redundancy is incorporated into the Visual RRC-humanoid robot claims section whenever visualization-AI is added to the procedural intelligence describe in the other patents and guided by the Procedural HTD (PHTD).

We claim:

1. A visual relational robotic controller-humanoid robot (RRC-humanoid robot) comprising:
   a human-like mechanical robotic system comprising a human-like tactile recording monitor and a human-like robotic body comprising a set of bipedal limbs, a set of arms, a set of hands, a set of fingers, an energy power source, and sets of motors and gears used to move the body, limbs, arms, hands, and fingers;
   a video visual recording monitor that is input to a humanoid RRC-controlled robot comprising an optical apparatus that faces an external environment and generates a real time 3D-photometric image that is a high fidelity light representation of measured photometric data of objects in a field of view (FOV) region of the optical apparatus, said video visual recording monitor comprising a plurality of video cameras that each has a camera lens of identical focal length, a plurality of color-detecting charge coupled device arrays (CCD-arrays) in which each CCD-array is located proximate to one of the video cameras, a convergent motor worms gear used to point the video cameras at a convergence point located on a midline line of sight (LOS), and a convergence angle sensor used to measure a depth of the convergence point;
   a relational robotic controller (RRC) that satisfies a set of specification requirements for relational robotic controllers;
   an interface circuit positioned between an auditory recording monitor and the RRC, said interface circuit configured to decompose a data stream of the visual image into collective modalities that yield a sharper, more highly resolved visual image, reconstruct the images of the collective modalities into a single Cyclopean eye, generate visual cues to convert two 2-dimensional images into a single 3-dimensional photometric image, generate a high fidelity 3-dimensional image of objects in the environment, integrate and internalize the 3-dimensional photometric image into a 3-dimensional self-knowledge Nodal Map Module (NMM); and
   a programming methodology defined by a Procedural Hierarchical Task Diagram (PHTD) specification that provides the robot a human-like form of visualization artificial intelligence (AI).

2. The visual RRC-humanoid robot of claim 1, wherein a convergence angle sensor is used by the optical apparatus to measure the depth of the convergence point.

3. The visual RRC-humanoid robot of claim 1, wherein said optical apparatus defines and indexes all pixels on two image planes located at the convergence point along the midline LOS during each frame period in a set of frame periods.

4. The visual RRC-humanoid robot of claim 3, wherein the two image planes exhibit binocular correspondence.

5. The visual RRC-humanoid robot of claim 4, wherein image data streamed from a CCD-array of a left-side video camera is separated from image data streamed from a CCD-array of a right-side video camera.

6. The visual RRC-humanoid robot of claim 5, wherein the image data of the CCD-array of the left-side video camera and the image data of the CCD-array of the right-side video camera is deconstructed into separate collective modalities.

7. The visual RRC-humanoid robot of claim 6, wherein each CCD-array data stream forms a low resolution color collective modality and multiple high resolution monochromatic collective modalities.

8. The visual RRC-humanoid robot of claim 6, wherein the binocular correspondence is reconstructed into a single multi-modal array that maintains the binocular correspondence of the CCD-arrays of the left-side video camera and the right-side video camera and also maintains retinotopic organization of the CCD-arrays of the left-side video camera and the right-side video camera.

9. The visual RRC-humanoid robot of claim 8, wherein the single multi-modal array is the Cyclopean eye.

10. The visual RRC-humanoid robot of claim 9, wherein improvements in the visual detection of the photometric image results from the electronic addition of collective modalities to the Cyclopean eye.

* * * * *